US012602661B2

(12) United States Patent
Mones et al.

(10) Patent No.: US 12,602,661 B2
(45) Date of Patent: Apr. 14, 2026

(54) SYSTEM FOR SEARCHING AND CORRELATING ONLINE ACTIVITY WITH INDIVIDUAL CLASSIFICATION FACTORS

(71) Applicant: FAMA Technologies, Inc., Venice, CA (US)

(72) Inventors: Benjamin Yale Mones, Los Angeles, CA (US); Collin James Scangarella, Los Angeles, CA (US); Alec Serge Andronikov, Austin, TX (US)

(73) Assignee: FAMA Technologies, Inc., Venice, CA (US)

( * ) Notice: Subject to any disclaimer, the term of this patent is extended or adjusted under 35 U.S.C. 154(b) by 1169 days.

(21) Appl. No.: 15/365,209

(22) Filed: Nov. 30, 2016

(65) Prior Publication Data

US 2017/0154314 A1 Jun. 1, 2017

Related U.S. Application Data

(60) Provisional application No. 62/261,159, filed on Nov. 30, 2015.

(51) Int. Cl.
  *G06Q 10/1053* (2023.01)
  *G06F 16/2457* (2019.01)
  (Continued)

(52) U.S. Cl.
  CPC ... *G06Q 10/1053* (2013.01); *G06F 16/24578* (2019.01); *G06F 16/2462* (2019.01);
  (Continued)

(58) Field of Classification Search
  CPC .... G06Q 10/1053; G06Q 50/01; G06Q 10/00; G06Q 30/0203; G06Q 10/04;
  (Continued)

(56) References Cited

U.S. PATENT DOCUMENTS 6,446,061 B1 * 9/2002 Doerre .................. G06F 16/355
                                                      707/738
7,542,969 B1 * 6/2009 Rappaport .......... G06F 16/3338
                                                      707/4
(Continued)

FOREIGN PATENT DOCUMENTS

CN 107851097 B * 10/2021 ......... G06F 16/2228

OTHER PUBLICATIONS

"Amazon Mechanical Turk," Amazon.com, Inc., <https://www.mturk.com/mturk/welcome> [retrieved Jan. 4, 2017], 1 page.
(Continued)

*Primary Examiner* — Lynda Jasmin
*Assistant Examiner* — Kimberly L Evans
(74) *Attorney, Agent, or Firm* — Davis Wright Tremaine LLP

(57) ABSTRACT

An attribute associated with an individual being screened for a category of conduct is obtained. A first set of data associated with the individual is obtained, based at least in part on the attribute, with a form of the first set of data being one of a plurality of disparate forms. A second set of data associated with the individual is obtained, based at least in part on the attribute, with a form of the second set of data being different from the form of the first set of data. The first set of data and the second set of data are transformed into a standard data structure. Contents of the standard data structure are input to an algorithm. A result from the algorithm is received that indicates that the individual is associated with the category of conduct, and the result is output to a user interface.

22 Claims, 9 Drawing Sheets

(51) Int. Cl.

| | |
|---|---|
| *G06F 16/2458* | (2019.01) |
| *G06F 16/25* | (2019.01) |
| *G06F 16/28* | (2019.01) |
| *G06N 5/025* | (2023.01) |
| *G06N 20/00* | (2019.01) |
| *G06Q 10/40* | (2026.01) |

(52) U.S. Cl.
CPC ............ *G06F 16/25* (2019.01); *G06F 16/258* (2019.01); *G06F 16/285* (2019.01); *G06N 20/00* (2019.01); *G06N 5/025* (2013.01); *G06Q 10/40* (2026.01)

(58) Field of Classification Search
CPC .. G06Q 10/067; G06Q 30/0282; G06Q 10/06; G06Q 10/087; G06Q 30/00; G06Q 10/40; G06F 16/285; G06F 16/25; G06F 16/258; G06F 16/24578; G06F 16/2462; G06F 19/321; G06F 19/325; G06F 11/3438; G06F 16/93; G06F 16/953; G06F 16/9558; G06F 16/957; G06F 2201/81; G06F 21/6245; G06F 16/00; G06F 16/2358; G06F 16/24573; G06F 16/24575; G06F 16/337; G06F 16/904; G06F 16/9535; G06F 11/1471; G06F 11/2071; G06F 11/2074; G06F 11/2076; G06F 16/2379; G06F 16/273; G06F 2201/84; G06F 2201/855; G06F 18/214; G06F 18/2411; G06F 40/30; G06F 9/44; G06N 20/00; G06N 5/025; G06N 20/10; G06N 5/022; G06N 5/04; G06N 3/045; G06N 3/047; G06N 3/084; G06N 7/01; H04L 63/10; G06K 9/6218; G06K 9/6267; G06V 10/764; G06V 10/774
USPC ......... 705/1.1, 26, 325, 321, 28, 310; 704/9; 707/692, 740, 748, 4; 709/204; 434/236
See application file for complete search history.

(56) References Cited

U.S. PATENT DOCUMENTS

| | | | | |
|---|---|---|---|---|
| 8,793,151 | B2 * | 7/2014 | DelZoppo .......... | G06Q 10/0635 705/7.28 |
| 10,720,081 | B2 * | 7/2020 | Zhou .................. | G09B 19/0092 434/236 |
| 11,210,300 | B2 * | 12/2021 | Ignatyev ................ | G06Q 10/00 706/12 |
| 11,379,506 | B2 * | 7/2022 | Stojanovic ........... | G06F 16/215 707/723 |
| 2005/0055231 | A1 * | 3/2005 | Lee .................... | G06Q 10/1053 705/319 |
| 2006/0041550 | A1 * | 2/2006 | Bennett .............. | G06F 16/9535 707/999.005 |
| 2010/0022376 | A1 * | 1/2010 | Ackermann .......... | B65H 45/30 30/329 |
| 2011/0282860 | A1 * | 11/2011 | Baarman .............. | G06F 16/951 707/E17.108 |
| 2012/0137367 | A1 * | 5/2012 | Dupont ................. | G06F 21/00 726/25 |
| 2012/0215784 | A1 * | 8/2012 | King .................... | G06K 9/6256 707/740 |
| 2012/0323558 | A1 * | 12/2012 | Nolan ................... | G06N 7/005 704/9 |
| 2013/0290207 | A1 * | 10/2013 | Bonmassar ........ | G06Q 10/1053 705/321 |
| 2014/0067951 | A1 * | 3/2014 | Sheinfeld .............. | H04L 67/535 709/204 |
| 2014/0279640 | A1 * | 9/2014 | Moreno .................. | G07C 9/22 705/325 |
| 2014/0279761 | A1 * | 9/2014 | Aliferis ................... | G06F 16/93 706/12 |
| 2014/0289323 | A1 * | 9/2014 | Kutaragi .............. | G06F 16/434 709/206 |
| 2015/0066711 | A1 * | 3/2015 | Chua ...................... | G06Q 30/00 705/28 |
| 2015/0127565 | A1 * | 5/2015 | Chevalier .............. | G06Q 10/00 705/319 |
| 2015/0358416 | A1 * | 12/2015 | Gariepy .................. | H04L 51/52 709/204 |
| 2016/0005001 | A1 * | 1/2016 | Muhammedali ... | G06Q 10/1053 705/319 |
| 2016/0224803 | A1 * | 8/2016 | Frank .................. | G06F 21/6245 707/748 |
| 2016/0253498 | A1 * | 9/2016 | Valencia .............. | G06F 21/554 726/23 |
| 2016/0253679 | A1 * | 9/2016 | Venkatraman ..... | G06Q 30/0185 705/310 |
| 2016/0283905 | A1 * | 9/2016 | Lahti ................... | G06F 16/9535 704/9 |
| 2016/0300252 | A1 * | 10/2016 | Frank ................ | G06F 16/24578 707/748 |
| 2017/0004413 | A1 * | 1/2017 | Flores ...................... | G06N 5/02 707/692 |
| 2017/0061345 | A1 * | 3/2017 | Jones, III .............. | G06Q 50/01 |
| 2017/0132688 | A1 * | 5/2017 | Freund .................. | G06Q 50/01 705/26 |
| 2017/0206557 | A1 * | 7/2017 | Abrol ................. | G06Q 30/0261 |
| 2017/0374093 | A1 * | 12/2017 | Dhar ................... | H04L 63/1433 |

OTHER PUBLICATIONS

"Clarifai: Getting Started," Clarifai, Inc., <https://developer.clarifai.com/guide/> [retrieved Jan. 4, 2017], 82 pages.
"Extjwnl (Extended Java WordNet Library)," © 2011-2016 Aliaksandr Autayeu, SourceForge Media, LLC <http://extjwnl.sourceforge.net/> [retrieved Nov. 30, 2016], 2 pages.
"Gensim," Wikipedia, The Free Encyclopedia, Sep. 21, 2016, <https://en.wikipedia.org/wiki/Gensim> [retrieved Nov. 30, 2016], 2 pages.
"GitHub—dlwh/breeze," © 2016 GitHub, Inc., David Hall <https://github.com/dlwh/breeze> [retrieved Nov. 30, 2016], 3 pages.
"imbalanced-learn," © 2016 GitHub, Inc., <https://github.com/scikit-learn-contrib/imbalanced-learn> [retrieved Nov. 30, 2016], 4 pages.
"Introduction to Deep Neural Networks," © 2016 Skymind, <https://deeplearning4j.org/neuralnet-overview> [retrieved Nov. 30, 2016], 9 pages.
"Jazzy: The Java Open Source Spell Checker," © Slashdot Media, SourceForge Media, LLC <http://jazzy.sourceforge.net/> [retrieved Jan. 4, 2017], 2 pages.
"MLlib," Apache Software Foundation, < https://spark.apache.org/mllib/> [retrieved Nov. 30, 2016], 4 pages.
"Natural Language Toolkit," © 2015 NLTK Project, NLTK 3.0 Documentation, <http://www.nltk.org/> [retrieved Nov. 30, 2016], 2 pages.
"scikit-learn," Wikipedia, The Free Encyclopedia, Nov. 23, 2016, <https://en.wikipedia.org/wiki/Scikit-learn> [retrieved Nov. 30, 2016], 2 pages.
"Stanford CoreNLP—a suite of core NLP tools: Human languages supported," The Stanford Natural Language Processing Group, <https://stanfordnlp.github.io/CoreNLP/#human-languages-supported> [retrieved Nov. 30, 2016], 6 pages.
"TextBlob: Simplified Text Processing," © 2016 Steven Loria, <https://textblob.readthedocs.io/en/dev/> [retrieved Nov. 30, 2016], 3 pages.
"The Stanford Parser: A statistical parser," The Stanford Natural Language Processing Group, <http://nlp.stanford.edu/software/lex-parser.html> [retrieved Nov. 30, 2016], 13 pages.
"vaderSentiment," © 2016 GitHub, Inc., Georgia Institute of Technology, <https://github.com/cjhutto/vaderSentiment> [retrieved Nov. 30, 2016], 5 pages.
"word2vec: Tool for computing continuous distributed representations of words," Google Code Archive, <https://code.google.com/archive/p/word2vec/> [retrieved Nov. 30, 2016], 8 pages.

(56) References Cited

OTHER PUBLICATIONS

"WordSegment," © 2006-2017 Microsoft, CodePlex, <http://wordseg.codeplex.com/> [retrieved Jan. 4, 2017], 2 pages.

"Xgboost," Wikipedia, The Free Encyclopedia, Sep. 29, 2016, <https://en.wikipedia.org/wiki/Xgboost> [retrieved Nov. 30, 2016], 2 pages.

"Inter-rater reliability," Wikipedia, The Free Encyclopedia, Sep. 12, 2016, <https://web.archive.org/web/20161120114508/https://en.wikipedia.org/wiki/Inter-rater_reliability> [retrieved Oct. 25, 2019], 5 pages.

* cited by examiner

200

| CPU 202 | | Subject Recognition Data Storage 210 |
| Memory 204 | | Sensitivity Classification Settings/Rules Storage 212 |
| Data Storage 206 | | Data Analysis Module 214 |
| NIC 208 | | Data Output Module 216 |

Figure 4:
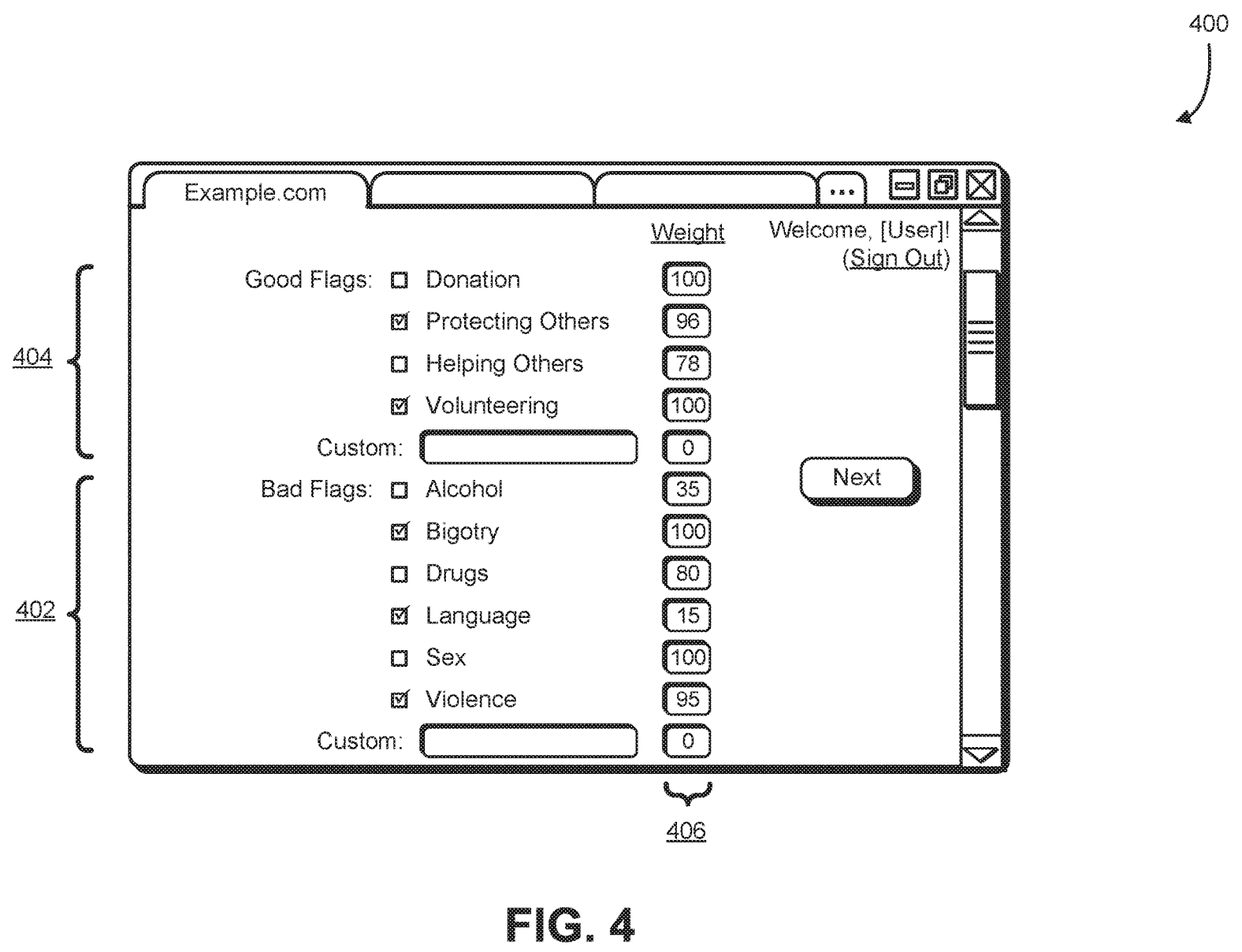

400

Example.com

Welcome, [User]
(Sign Out)

Weight

Good Flags:  ☐ Donation                     100
            ☑ Protecting Others              96
            ☐ Helping Others                 78
            ☑ Volunteering                  100

Custom: [                    ]               0

Bad Flags:  ☐ Alcohol                        35
            ☑ Bigotry                       100
            ☐ Drugs                          80
            ☑ Language                       15
            ☐ Sex                           100
            ☑ Violence                       95

Custom: [                    ]               0

} 406

Next

Receive Initial Source Data — 604

Key Attributes Extraction — 606

Success? — 608 →No→ Notify User — 610

Yes

Collect Online Activity Raw Data — 612

Classify According to Filters and Preferences — 614

Sort and Return Top/Relevant Results (URLs/Images) — 616

Quality Evaluations — 618

Receive Filters and Preferences — 619

Data Delivery — 620

700

Receive Request for Data — 702

Translate Request into Format Compatible with Data Source — 704

Submit Request for Data to the Data Source — 706

Success? — 708

No → Error — 710

Yes

Obtain Response from Data Source — 712

SYSTEM FOR SEARCHING AND CORRELATING ONLINE ACTIVITY WITH INDIVIDUAL CLASSIFICATION FACTORS

CROSS REFERENCE TO RELATED APPLICATION

This application claims priority from U.S. Provisional Application No. 62/261,159, filed on Dec. 17, 2015, entitled "SYSTEM AND METHOD FOR FACILITATING SEARCHES AND ANALYSIS OF OPEN AND CLOSED SOURCE SOCIAL MEDIA AND SEARCH PROFILES AVAILABLE ONLINE FOR PURPOSES OF AGGREGATING, IDENTIFYING AND MONITORING POSITIVE AND NEGATIVE PREDETERMINED CLASSIFICATION FACTORS ON INDIVIDUALS," the content of which is incorporated by reference herein in its entirety for all purposes.

BACKGROUND

The task of extracting publicly available information and correlating attributes of various text, images, and other media with individual classification factors via the Internet is difficult, labor intensive, time-consuming, and subject to bias. However, in certain situations, such as in making hiring decisions for potential candidates, the failure to examine an individual's social media profiles and digital footprints can put company's reputation at risk. The distillation of ideal target data is a manual process and one that presents a significant drag on productivity and standardization of results. Furthermore, manually combing through various online sources risks introducing unintentional bias against a protected class under federal or state law. In short, there is a need for a way for professional recruiters to access a centralized Internet database that distills targeted data gathered from various online sources.

BRIEF DESCRIPTION OF THE DRAWINGS

FIG. 4 illustrates an example of an interface for selecting filters in accordance with an embodiment;

DETAILED DESCRIPTION

Figure 1:
FIG. 1 illustrates a system architecture for data searching and analysis in accordance with the present disclosure.
Figure 1:
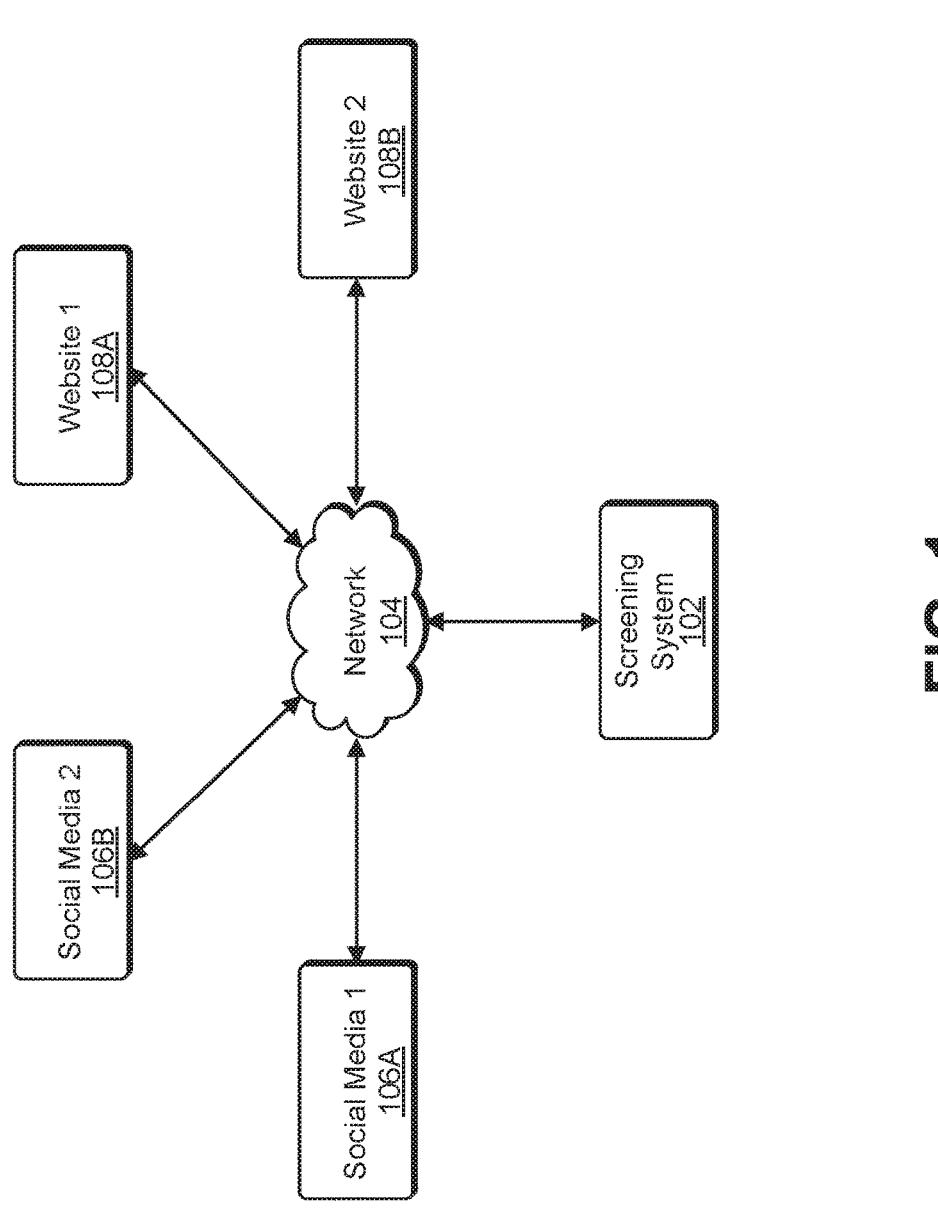

Techniques and systems described below relate to a data search, aggregation and analysis system that provides a client (e.g., a potential employer, individual, service provider, investor, etc.) with a clear, easy-to-read online and mobile dashboard gathered from open and closed social media, and public websites, and searches for a specific person or a group of people. For example, a number of different criteria found in online activity, including social media, may be considered important by a job recruiter to factor into a hiring decision. Such important criteria may include illegal drug references, posts of a sexual nature, spelling and grammar, profanity, firearms, alcohol, or other criteria. In some examples, the term "employee" may refer to any individual in a business or employment relationship (e.g., full-time, part-time, permanent, temporary, contractual, as a consultant, etc.). It must be noted that although the techniques described in the present disclosure frequently refer to potential business relationships, the principles and techniques described could also be used to evaluate potential personal relationships.

The client predetermines positive and negative classification factors that may be referred to as "flags" or "filters," outlining a subset of ideal target data that can be used to create a set of identification factors that the system searches for. The system can be fed inputs for data to be searched across networks to which the system has access (e.g., open networks and networks to which the system can authenticate). The data may come in the form of social media posts, photos, videos, "likes," "check-ins," blog-posts, news articles, message boards, and public websites and any content for which the system can identify a chain of custody that falls within the accuracy threshold of client demand.

The system obtains initial source data and a relevant data preference from a user of the system. The initial source data may be a document, such as a résumé, job application form, or curriculum vitae (CV) that contains personally identifiable data usable to identify an individual being screened/ investigated by the user. The relevant data preference may be criteria (e.g., desirable/undesirable characteristics, likes/ dislikes, indications of good/bad behavior, or other categories of conduct) that the user considers indicative of a category of data that is important to the data search, aggregation, and analysis. From the initial source data, the system may extract one or more key attributes. The key attributes may be a set of personally identifiable data (e.g., email address, phone name, phone number, etc.) usable to determine a likelihood that data obtained from an online source is associated with the individual.

The system may then obtain unstructured data from an online source (such as a search engine, social media site, etc.) associated with the individual. That is, the system may pass one or more of the key attributes to the online source as a parameter in an application programming interface (API) call, and receive the unstructured data in response. Alternatively, the system may scan or parse a webpage for occurrences of one or more of the key attributes, thereby indicating a certain probability that the contents of the webpage are associated with the individual. The unstructured data may be received as in the form of one or more disparate data types, the disparate data types including various text formats, digital image formats, video encoding formats, audio encoding formats, and other data types.

The system may transform the unstructured data into at least one structured dataset. That is, a machine learning algorithms of the system may support one or more data structure formats for inputting data. Consequently, the system may process the unstructured data in order to transform the data into a structure supported by the machine language algorithm. In some examples, this process involves visual recognition processing on visual data, speech recognition processing on audio data, or natural language processing on text data in order to produce a set of values or labels that are used in a data set that conforms to the data structure supported by the machine language algorithm.

The system may determine that the unstructured data is associated with the category of data indicated by the relevant data preference. The system may make the determination by passing at least one structured dataset derived from the unstructured data as input to the machine learning algorithm. The machine learning algorithm may output a result that indicates a likelihood or probability to an amount of statistical certainty that at least one structured data set, and hence the unstructured data obtained from the online source, is associated with the relevant data preference. Finally, the system may generate a report based on the result and present the report in a user interface. The report may be organized in a variety of ways and may allow the user to interact with various aspects of the report; such as the user may click on a category that has been flagged as associated with the relevant data preference, and, in response, the user may receive further details, which may include presentation of the unstructured data obtained from the online source.

The system and method facilitates the current method of searching open and closed social media, and publicly available websites, and searches for individuals or groups. Application of the system and method is flexible, with one application being discovery and monitoring of "flags" of a group or individual in social media and search results. Another application of the system is that it analyzes the collection of flags in aggregate, identifying the unique combination of flags for a group or individual as a unique marker unto itself. Another application of the system and method may be in the fields of applicant recruiting, workforce performance monitoring, dating, contractor hiring, goods and services, purchasing from resellers, and so on.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of decision support systems, by aggregating and displaying data gathered from multiple information sources. Additionally, techniques described and suggested in the present disclosure improve the efficiency of decision support systems by dynamically retrieving and aggregating data from multiple sources, determining correlations between disparate data, and making determinations as to relevance of the data based on the correlations. Moreover, techniques described and suggested in the present disclosure are necessarily rooted in computer technology in order to overcome problems specifically arising with decision support systems by utilizing machine learning techniques to make accurate decisions about individuals based on online activity of disparate media formats and from varied sources.

FIG. 1 illustrates an environment 100 in which an embodiment may be practiced. As illustrated in FIG. 1, the environment 100 may include a network 104 usable through which a screening system 102 can communicate to social media sites 106A-06B, various websites 108A-08B, and other online data sources.

The screening system 102 may be coupled to the network 104. The screening system 102 may be used to perform character and personality-based investigations of an individual by using user-defined criteria to search various sources (e.g., the social media sites 106A-06B and the various websites 108A-08B) to automatically retrieve and analyze data related to individuals. Although illustrated in FIG. 1 as a single device, it is contemplated that the screening system 102 could be implemented as a distributed architecture where one or more components of the screening system 102 could be in different physical locations and connect by a local area network (not shown) or by the network 104 (e.g., the Internet).

The network 104 may represent a path of communication between screening system 102 and various online sources of data, such as the social media sites 106A-06B and the various websites 108A-08B. Examples of the network include a local area network, a wide-area network, a virtual private network, the Internet, an intranet, an extranet, a public switched telephone network, an infrared network, a wireless network, a satellite network and any combination thereof.

The social media sites 106A-06B are intended to represent a plurality of various social media sites hosting profiles of an individual associated with initial source data provided by a user. The social media sites 106-06B may be communicatively coupled to the network 104. The various websites 108A-08B are representative of a plurality of websites that may contain data associated with the individual. The various websites 108A-08B may be independent of the social media sites 106A-06B or may be portions of the social media sites 106A-06B. For example, the individual may have a personal website as well as webpages associated with the social media sites 106A-06B.

Figure 2:
FIG. 2 is a functional block diagram of a computer configured to perform the data searching and analysis in accordance with the present disclosure.
Figure 2:
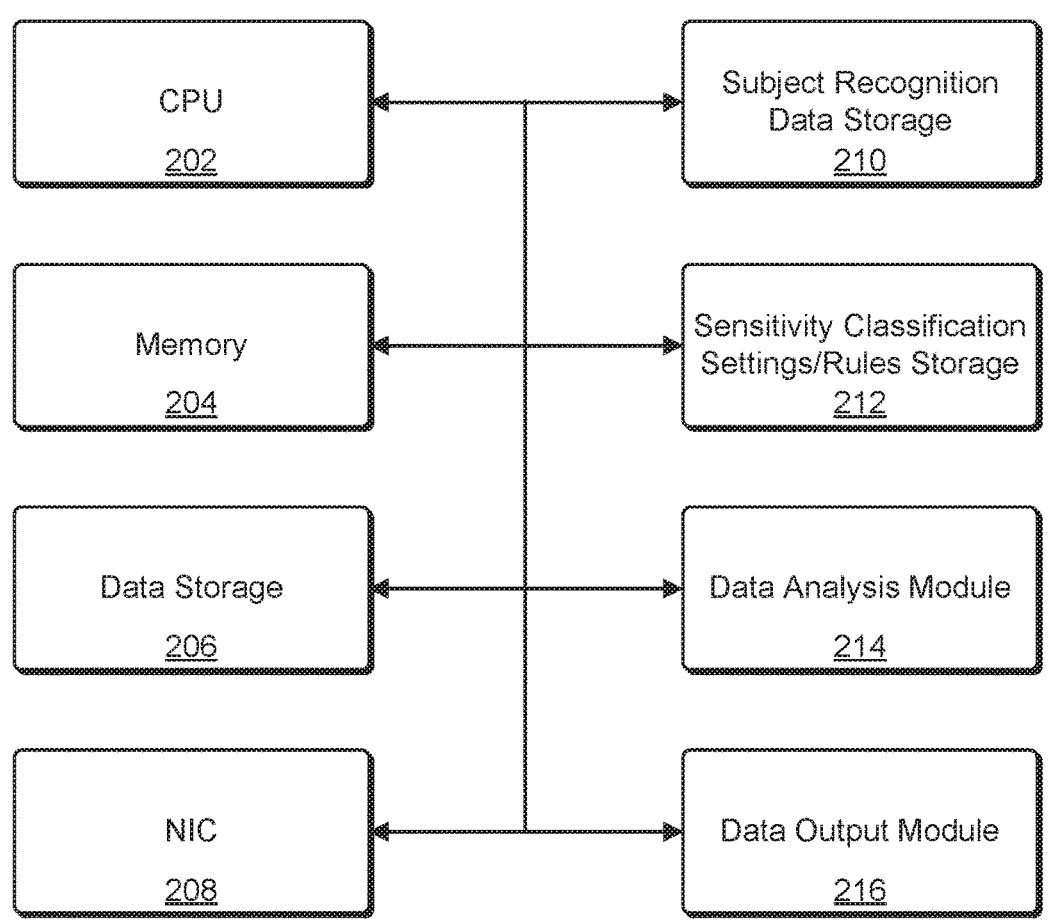

FIG. 2 is a functional block diagram of an example embodiment 200 of a screening system of the present disclosure. Specifically, FIG. 2 depicts the example embodiment 200 as a computing device that includes a central processing unit (CPU) 202, memory 204, data storage 206, and a network interface controller 208. The example embodiment further includes subject recognition data (SRD) storage 210, sensitivity classification settings (SCS) storage 212, a data analysis module 214, and a data output module 216.

The CPU 202 may be any suitable processing device, such as one or more of a microprocessor, a co-processor, a micro-controller, a microcomputer, a graphics processing unit, application specific integrated circuit (ASIC), digital signal processor (DSP), custom reduced instruction set computing (RISC) chip, or some other programmable logic device. Examples of such processing devices include devices based on an x86 architecture, a RISC architecture (including ARM, Power Architecture, Princeton, CISC, Harvard and Blackfin architectures), and scalable processor architecture (SPARC). The example embodiment 200 is not to be read as being limited by the specific form of the CPU.

The memory 204 may store instructions and data to control operation of the CPU 202. The memory 204 may include a number of memories including random access memory (RAM) for storage of data and executable instructions, ready-only memory (ROM) in which fixed instructions and data may be stored, programmable memory, flash memory for persistent storage, and the like. The memory 204 may also be integrally formed in whole or in part with the CPU 202. The example embodiment 200 is not to be construed as being limited by any specific form of hardware used to implement the memory 204.

The data storage 206 may provide non-transitory persistent (non-volatile) storage for program and data files, and may include one or more of magnetic media (e.g., hard disk drive, a floppy disk drive along with associated removable media), optical media (e.g., compact disc (CD), a digital versatile disc (DVD), Blu-ray disc, etc.), flash memory (e.g., solid-state drive, etc.), cloud-based data storage (such as Amazon Web Services or Google Cloud) holographic data storage, and other like storage media. The data storage 206 may be removable or non-removable.

The network interface controller (NIC) 208 may be used to control communication between the example embodiment 200 and a network, such as the network 104 of FIG. 1, by way of a cable or may be wirelessly connected to the network, such as through Wi-Fi. Ultimately, such a network may connect to the Internet. The NIC 208 may have a physical layer consisting of the basic hardware transmission components for computer networking. The physical layer may supply encoding/decoding functionality and timing functions for interfacing the NIC 208 with the network through network media, such as through an RJ-45 cable or optical cable. Examples of the NIC 208 include Ethernet, Wi-Fi, and token ring configurations in peripheral component interconnect (PCI), PCI Express, ExpressCard forms as well as being integrated with other circuitry of the example embodiment 200, such as on a motherboard in one or more integrated chips (ICs).

The SRD storage 210 may be a part of the memory 204 or part of the data storage 206. As described in the present disclosure, the SRD storage 210 may be different/separate per individual being researched. As the SRD is developed, the SRD may be stored in the SRD storage 210 for subsequent use. The SCS storage 212 may be part of the memory 204 or part of the data storage 206. As described in the present disclosure, the SCS may be selected by a user and may contain general classifications selected by the user as well as settings that may be specific to the individual whose background is being verified.

The operation of the data analysis module (DAM) 214 may be to analyze collected data as described in the present disclosure. The DAM 214 may be a plurality of hardware and software components configured to retrieve data from various sources, convert the data to a format suitable for processing by a machine learning algorithm, and outputting a decision based on the converted data. The DAM 214 may comprise components such as a data retrieval component for making application programming interface calls to various data sources, visual recognition software for converting images or videos to text labels, natural language processing algorithms for converting text to text labels, and/or a machine learning engine. Further details regarding the DAM 214 may be found in the description of FIG. 3. In some examples, "text" may refer to data represented by human identifiable characters, but not its graphical representation or other objects (images, etc.). Text may include plaintext and/or formatted text, but in some embodiments exclude binary text in which portions of the binary text are binary objects (e.g., images, machine code, executable instructions, etc.). In examples, an "image" may refer to a two-dimensional or three-dimensional image, of a vector or raster type, comprised of a set of digital values. In various examples, "video" may refer to a representation of moving visual images in the form of encoded digital data. Likewise, in some examples, "audio" may refer to audio that has been encoded in digital form and can be used to reproduce sound using audio signals.

Figure 5:
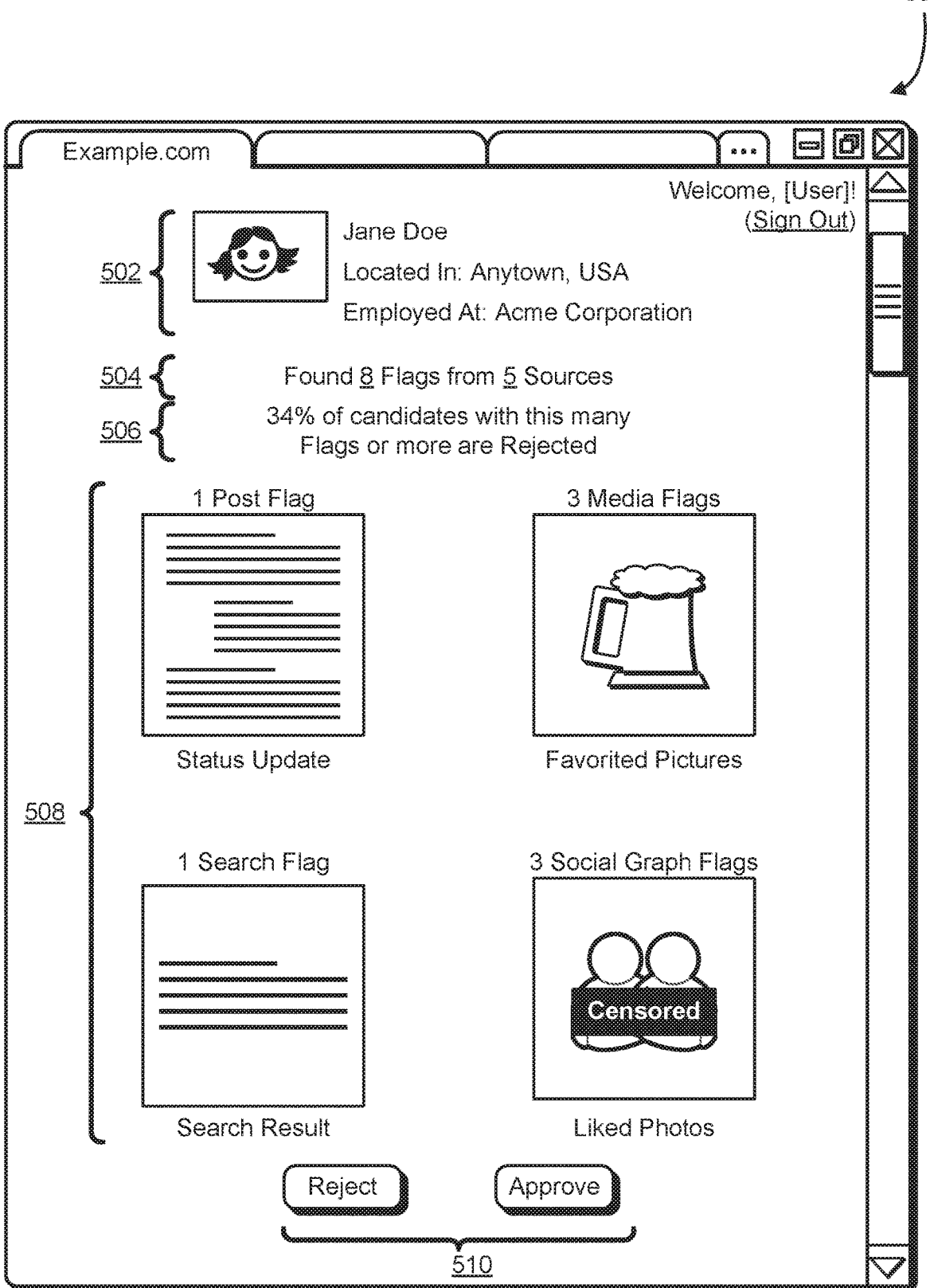
FIG. 5 illustrates an example report in accordance with an embodiment.

The data output module 216 may consolidate the data, organize the data and generate an easy-to-read report for the client, such as the report illustrated in FIG. 5. The example embodiment 200 of FIG. 2 may also include other components, such as a display, keypad or keyboard, cursor control device (e.g., a mouse), and the like, which are omitted from FIG. 2 for the sake of brevity.

Figure 3:
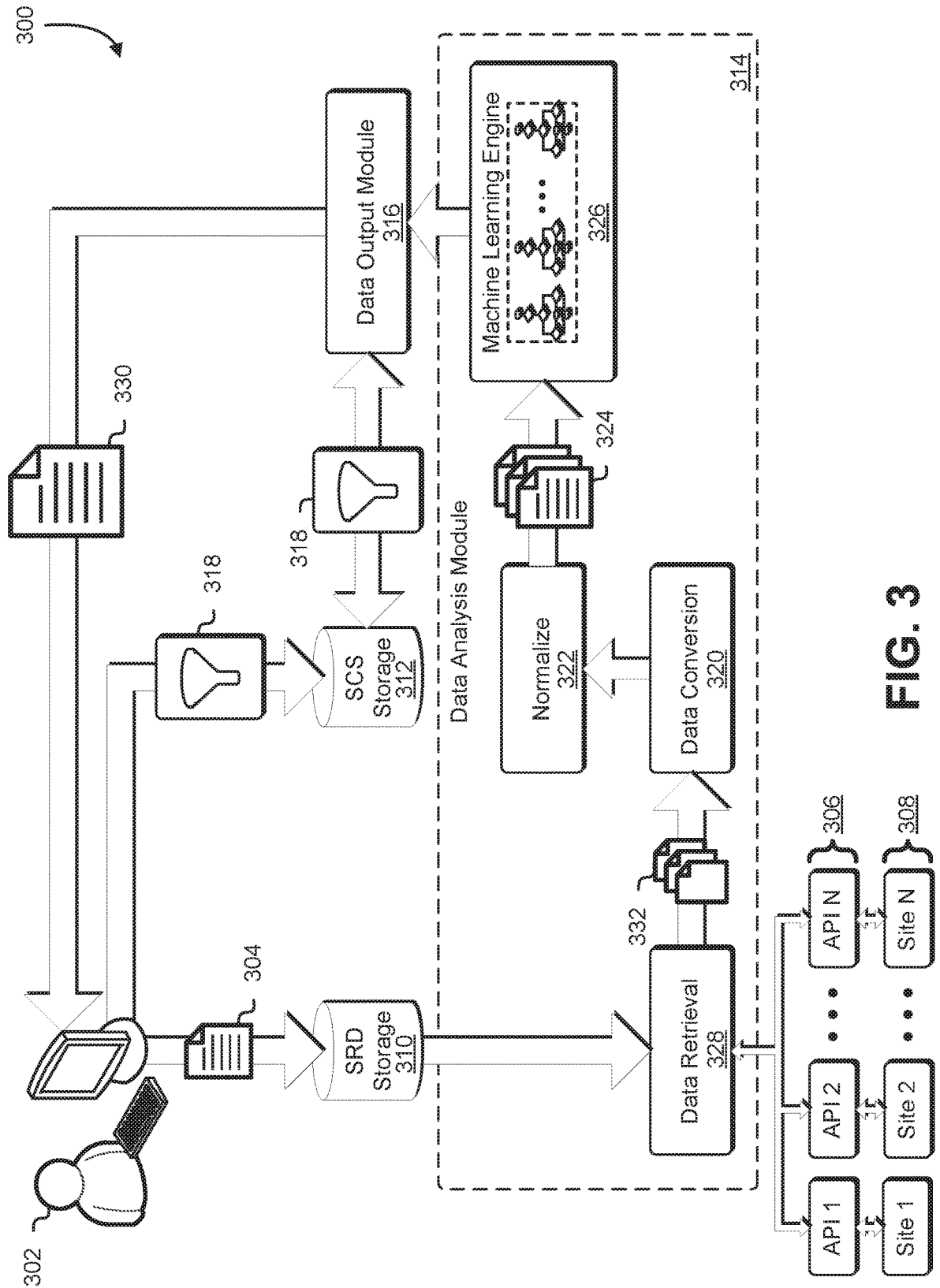
FIG. 3 illustrates an example of a screening system in accordance with an embodiment.

FIG. 3 illustrates an aspect of an environment 300 in which an embodiment may be practiced. As illustrated in FIG. 3, the environment 300 may include a user 302 that submits initial source data from which subject recognition data, usable to identify with statistical certainty that a set of data is associated with an individual, may be extracted as a set of key attributes.

The user 302 may be an individual, computing device, application, or other entity that has been authorized to screen one or more individuals in the manner described in the present disclosure. Each user may have a username within the account and may present, or otherwise prove, the possession of security credentials, such as by inputting a password, access key, and/or digital signature, to gain access to the account. The user may access the account using a computing device, such as a computing device similar to the computing device 900 of FIG. 9. For example, the user 302 may be an authorized member of human resources for a company having an account with a provider of the screening system 102 of FIG. 1 or for a company having a license to use software that performs the process 600 of FIG. 6. The user 302 may utilize the screening system 102 to evaluate an individual that has applied for a job with the company.

The initial source data 304 may be one or more documents containing personally identifiable information (PII) about the user that can be extracted to form a set of key attributes. Examples of initial source data 304 include documents that present details of an individual's background (including work experience, skills, or other qualifications), such as résumés, CVs, completed job application forms, or cover letters. Other examples of initial source data include credit reports, education transcripts, or other similar data. A set of key attributes usable for determining whether information gathered from other sources is associated with the individual may be extracted from the initial source data 304. Examples of key attributes include email address, location (e.g., mailing address), employer name, job title, education information (e.g., name of school, major, graduation date, years attended, etc.), and so on. In some cases, the set of key attributes and/or initial source data may be manually entered, such as via an online frontend to the screening system 102. The initial source data 304 and/or the set of key attributes extracted from the initial source data 304 may be stored at least temporarily in the SRD storage 310 for use by the DAM 314.

The filters 318 may refer to user-specified/selected criteria, rules, or preferences that the system of the present disclosure is to screen an individual for or against. The filters may represent categories of conduct or desirable or undesirable characteristics that the user seeks to screen the individual for or against. The filters may alternatively be referred to as sensitivity classification settings. The filters 318 may have associated weights, which may or may not be configurable by the user, depending on the particular implementation. The example interface 400 of FIG. 4 shows a list of selectable filters 318. In some embodiments, the user can input custom filters or search criteria. In some implementations, the filters 318 also include immutable filters, such as filters corresponding to protected classes under the Fair Credit Reporting Act (FCRA) and/or the Equal Employment Opportunity Commission (EEOC). The client using the service may select which users may or may not have visibility (i.e., be able to see the list of immutable filters in a dashboard or console) to the immutable filters.

The user 302 may input the initial source data 304 and select the filters 318 via an interface, which may be implemented as an executable application on the computing device of the user 302, through a web page of the provider of the screening system accessed through a browser on the computing device of the user 302, programmatically through a remote procedure call, or some similar manner.

The SRD storage 310 may be similar to the SRD storage 210 of FIG. 2. The SCS storage 312 may be similar to the SCS storage 212 of FIG. 2. The DAM 314 may be a similar to the DAM 214 of FIG. 2. The DAM 314 may include various components, such as the data retrieval module 328, the data conversion module 320, the normalization module 322, and the machine learning engine 326. Components DAM 314 may execute on a single computer system or the components may be distributed among a plurality of communicatively coupled computer systems. The DAM 314 may output its results to the data output module 316, which may then format the output into the report 330 for the user 302.

The data retrieval module 328 may be a representational state transfer (RESTful) application or service that fetches data from the sites 308. In embodiments, the data retrieval module fetches the data from the sites 308 by utilizing webhooks (i.e., user-defined HyperText Transfer Protocol (HTTP) callbacks) or making compatible calls to the APIs 306 of the sites 308. In response to calls to the APIs 306, the data retrieval module 328 may receive raw data (e.g., text, video, images, or a hybrid combination of the aforementioned), which may be output to the data conversion module 320 in the form of the unstructured data 332.

The sites 308 may be online data sources such as the social media sites 106A-06B and websites 108A-08B of FIG. 1. The sites 308 may be Internet domains associated with a collection of related webpages published on at least one web server. The sites 308 may include data of various types, including multimedia content. The sites 308 may be accessible via a public Internet Protocol (IP) network, such as the Internet or local area network (LAN), by a uniform resource identifier (URI) or IP address that identifies the sites. The sites 308 may be provided by an individual, a business, a government, or a non-profit organization. The sites 308 may be dedicated to a particular topic or purpose, such as entertainment, news, education, or social networking. Some of the sites 308 may require registration or a subscription to access content and may require an entity attempting to access a site to authenticate (e.g., provide proof of credentials) to the site. For such sites, the data retrieval module 328 may be able to access such information as is publicly available. Some of the sites 308 may be associated with web pages that can be viewed in a browser on a compatible computing device, such as a laptop computer, desktop computer, tablet computer, smartphone, smart television, or the computing device 900 of FIG. 9.

The data retrieval module 328 may retrieve data from the sites 308 by making application programming interface calls to the APIs 306 and passing one or more parameter values (e.g., the individual's email address, full name, telephone number, etc.) with the calls. The APIs 306 may be APIs provided by the sites 308 to customers or other users. An example of a call to one of the APIs 306 is the Twitter API call "GET statuses/user_timeline" that returns a collection of the most recent Tweets posted by an individual indicated by a screen_name or user_id parameter. The responses received from the APIs 306 may include data not considered relevant for the purpose of the present disclosure (e.g., "profile_side-bar_fill_color," "time_zone," "friends_count," etc.). Such data not considered relevant may be filtered out by the data conversion module 320 and/or the normalization module 322.

In some embodiments, the data retrieval module 328 utilizes graph analysis to obtain data associated with the individual. For example, in order to improve the accuracy of the data retrieval where some key attributes for the individual are common (e.g., the individual may have a common name in a populous location, such as "James Smith" in New York, NY), the data retrieval module 328 may submit a number of data retrieval requests using various combinations of the set of key attributes (e.g., full name+location, given name+employer, given name+middle initial+college name, family name+phone number, etc.) and determine the information most likely to be associated with the individual based on number and/or types of intersecting data. For example, if a search on a given name of an individual and a name of a college attended by the individual name retrieves the same news article as a search on the family name of the individual and phone number of the individual, the data retrieval module 328 may determine that the news article has a high probability (e.g., above a threshold probability) of being associated with the individual. As described in the present disclosure, key attributes may be associated with different weights and the probability determined may be based on the weights of the key attributes used to retrieve the data. In some implementations, the determination of the probability is determined using a machine learning algorithm trained on a dataset developed through inter-rater agreements.

Note that the intercoder reliability described in the present disclosure correspond to degrees of agreement between disparate individuals judging the same target data. That is, different individuals may be presented with data (e.g., an image, a comment in a social media stream, a blog entry, a video, an audio clip, etc.) and asked to judge whether the data corresponds to a particular category (e.g., alcohol, bigotry, helping others, volunteering, truth, sincerity, etc.). The category may be one of the categories the machine learning engine*328 is intended to screen data for. The votes/judgment of the individuals may then go into the training data used to train the machine learning engine*328. The more that individuals agree on the category of particular data, the more accurately the machine learning engine*328 may be expected to identify such categories in other pieces of data. Because judges may unintentionally influence decisions by other judges, the more disparate the judges are, the more accurately the machine learning engine*328 may be trained from the training data. Likewise, using judges from different cultures and/or geographic regions may further affect the inter-rater agreements of the training data.

Data obtained from the sites 308 may be received in any of a variety of formats, but may not conform to a standard structure recognizable by the machine learning engine 326, and consequently may be referred to in the present disclosure as "unstructured data." That is, data may be obtained in the form of images, video, text, or any combination thereof that must be transformed into a standardized/structured data format that is usable for input by the machine learning engine 326. For example, an Instagram photo is of a different format than an abstract of a news article in a list of search results. Moreover, data obtained from one of the sites 308 may be of a different format than data obtained from another one of the sites 308. For example, a "tweet" obtained from Twitter may be structured differently from a Facebook post, which in turn may be structured differently from a Google+ post. The unstructured data 332 represents the data in various formats as obtained from the sites 308. For uniform and accurate processing by the machine learning engine 326, the unstructured data 332 may be passed through the data conversion module 320 and the normalization module 322 to produce the normalized data 324. The normalized data 324 allows data of various types and from various sources to be input to the machine learning engine 326 in a consistent format.

The data conversion module 320 may be one or more software applications that distill data of a particular data type (e.g., image, video, audio, text, or mixed media) and outputs data that describes the contents of the data of the particular data type. For example, the data conversion module 320 may receive a digital image, perform various operations (e.g., edge detection, pattern matching, etc.) to identify objects within the digital image, and output a text description of the image. The data conversion module 320 may take note of lighting conditions (e.g., dark), colors of the objects, and so on. The output of the data conversion module 320 may be a text description of the objects recognized in the digital image, whether the scene depicted in the image appears to be indoors or outdoors, an estimate on the time of day (e.g., evening, morning, daytime, etc.), or even a general mood of individuals in the digital image (e.g., based on facial expression, body position, etc.).

As an example, the data conversion module 320 may receive a digital picture of a scenic landscape and output text labels of "lake, wood, water, fall, nature, no person, reflection, outdoors, landscape, scenic, mountain, wild, tree, river, daylight, conifer, travel, evergreen." As another example, the data conversion module 320 may receive a digital picture of a classic automobile and output text labels of "vehicle, car, dashboard, transportation system, drive, dial, guidance, classic, no person, dash, fast, speedometer, old, vintage, shift, nostalgia, wheel, chrome, instrument, steering wheel." As still another example, the data conversion module 320 may receive a digital picture of a couple in a restaurant and output text labels of "people, adult, woman, man, two, portrait, drink, coffee, indoors, family, happiness, couple, girl." The data conversion module 320 may also output a list of dominant colors found within the digital image, which may or may not be sorted in order of frequency. In some implementations, the data conversion module 320 includes a quantity of some or all of the objects recognized. The data conversion module 320 may similarly convert video files to their text descriptions. In addition, the audio track may be passed through a speech recognition processor to obtain the text from the audio. It is noted that audio data of various formats (with or without video) may be processed similarly. In some embodiments, the data conversion module 320 processes image using deep learning (also known as deep structured learning, hierarchical learning, and deep machine learning) rather than simply transforming the image into a series of text labels. For example, an image may be transformed into a set of edges or regions of shapes, and processed using pattern analysis or other algorithms in multiple layers of nonlinear processing units. Each successive layer may use output from the previous layer as input. The output of the deep learning process may be a text description, table, or hierarchical data structure that includes details about the image from which the machine learning engine 326 can determine more accurate results than a single-layer object recognition image-to-text algorithm.

Text data obtained from the sites 308 may be processed by a natural language processing application or algorithm of the data conversion module 320 to determine characteristics of the text. For example, a social media post mentioning that, "John is in San Francisco for the first time. Tomorrow night he and I are going downtown," may be processed and output with text labels of "person, location, ordinal, male, two, night, date/time." However it is also contemplated that, in some implementations, text input is output without being converted. Mixed media (e.g., images with text, text and images together, etc.) may be separated and processed individually. The output may be in one of a variety of text formats, such as JavaScript Object Notation (JSON) or eXtensible Markup Language (XML). Examples of data conversion modules are Clarifai API, Stanford CoreNLP, the Stanford Parser, DeepLearning4j, Extended Java WordNet Library, Natural Language Toolkit, Valence Aware Dictionary and sEntiment Reasoner, TextBlob, and Gensim.

The normalization module 322 may be an application that transforms the text descriptions output from the data conversion module 320 into data having a consistent format (e.g., the normalized data 324) that can then be passed through the machine learning engine 326. In some embodiments, one or more data structure formats are utilized to achieve consistent formats for the normalized data 324. For example, one data structure may be use for a news or search result, while another data structure may be used for a social media post. The data structures may contain one or more fields, and not all fields may be required. For example, an image from a social media post and a text social media post may utilize the same social media post data structure; however, the image post may not have an entry in a "Text:" field, while the text post may not have an entry in an "Image:" field. In some implementations, some data types have multiple data structures, the selection of which may depend on how the data is to be used. For example, one data structure for a data type (e.g., image, text, video, etc.) may be serializable and can be sent across a network, while another data structure for the data type may not be serializable but may be persistent in a database.

An example of a standardized data structure for a "post" by an individual can be seen below:

```
    comments : Array[0]
    date : Tue Jun 07 2021 16:52:38 GMT-0700 (PDT)
    flaggedKeywords : Array[0]
    flaggedSensitivities : Array[0]
    mediaEntries : Array[0]
    permission : "MANUAL_POST_RATE"
    postType : "ORIGINAL"
    profileHandle : "realJohnDoe"
    profileType : "TWITTER"
    siteId : "67890678906789067890" status : "NEUTRAL"
    text : "I will be interviewed tonight on @channel12 - Enjoy!
10:00 P.M."
    url :
"https://twitter.com/12345/status/67890678906789067890"
    uuid : "987616e4-9846-3c89-abc9-a5d7a9889569"
```

An example of a standardized data structure for "news and search results" of an individual can be seen below:

```
    contentDate : Wed Nov 23 2021 06:16:00 GMT-0800 (PST)
    retrievalDate : Tue Nov 22 2021 16:00:00 GMT-0800 (PST)
```

-continued

```
    displayUrl : "https://example.com/2021/11/dcb45ca869-web-
redesign-process/"
    flaggedKeywords : Array[0]
    flaggedSensitivities : Array[0]
    originalUrl : "https://example.com/2021/11/dcb45ca869-web-
redesign-process/"
    permission : "MANUAL_NEWS_RATE"
    personSearchContentDecision : "NEUTRAL"
    personUuid : "d6ac79aa-1aaa-5090-0fee-0ef080b0111d"
    relevant : ""
    source : ""
    text : "This is not the only reason why one should go for
it. Even if you are happy with the design of your website, you
may want to add some more functionality to make it more appealing
and user-friendly. Even if you are yet to add new features in
your website ..."
    title : "Add Increased Functionality To Your Website "
    uuid : "c173c081-3516-4494-acca-0d7ea57731ca"
    webDataProviderType : "NEWSSEARCH"
    webDataType : "NEWS"
```

Thus, the text data may be received by the normalization module 322 from the data conversion module 320. The text data may be analyzed for patterns or recognized words. An appropriate data structure may be determined (e.g., based on the type of data; digital image, social media post, news or search result, etc.), and the fields of the data structure may be determined and filled based on the recognized patterns or words. This completed data structure may be output from the normalization module 322 as the normalized data 324. The normalized data 324 may be a set of field values corresponding to characteristics identified in the unstructured data 332 by the data conversion module 320. The set of field values may be organized in a manner that is compatible for input to the machine learning engine 326, and the set of field values organized in this manner may be referred to in the present disclosure as "a structured dataset." In some implementations, mixed media is combined into a single structured dataset or may be output by the normalization module 322 as multiple structured datasets, each corresponding to a particular media type. In various implementations, the structured dataset is persistently stored for use in training the machine learning engine 326 to make more accurate determinations.

The machine learning engine 326 may be employ one or more supervised learning techniques, unsupervised learning techniques, semi-supervised learning techniques, transduction or transductive inference techniques, reinforcement learning, developmental learning, or the like. In various embodiments, the machine learning engine 326 performs its analysis of the normalized data 324 using one or more machine learning algorithms, such as: decision trees, association rule learning, deep learning, inductive logic programming, support vector machines, cluster analysis, Bayesian networks, naïve Bayes classifiers, learning automata, Gaussian process regression, nearest neighbor, random forest, ordinal classification, k-means clustering, lazy learning, artificial neural network, or generally any suitable machine learning algorithm or combination of algorithms.

The machine learning engine 326 may be self-learning. That is, the dataset from which the machine learning engine 326 is trained may be updated from time to time (e.g., weekly, biweekly, triweekly, etc.) using the normalized data 324 and the machine learning engine 326 may be retrained using the updated dataset. In this manner, as the dataset may be updated and refined, the machine learning engine 326 may become more accurate in determining the appropriate categories for the various types of the normalized data 324.

The initial dataset used by machine learning engine 326 may be a "training" dataset based on an exemplary collection of inter-rater agreements of a group of individuals. For example, a text message containing an emoticon can be voted on separately by different persons having no knowledge of each other as to whether the individual that produced the text and emoticon is sincere or not. The machine learning engine 326 may be trained on such data, and the larger the dataset the more accurate the machine learning engine 326 is likely to be. In this manner, the machine learning engine 326 can be trained to distinguish between relevant information, irrelevant information, and how different types of content should be categorized. Examples of machine learning libraries include DeepLearning4j, Apache Spark MLlib, Breeze, Xgboost, and Scikit-learn.

In an example of workflow, the data retrieval module 328 obtains a digital image associated with the individual being screened. The data conversion module 320 analyzes the digital image and outputs text labels of "indoors, bottle, sign, stool, chair, bar top." The text labels may be normalized by the normalization module 322 into a standard data structure (e.g., the normalized data 324), which may be input to the machine learning engine 326. The machine learning engine 326 may determine that the words/labels most frequently correspond to a known category (e.g., "alcohol"). If the category is one of the filters 318 specified by the user, the data output module 316 may note in the report 330 that the digital image is flagged as corresponding to one of the sensitivity classification settings.

The machine learning engine 326 may utilize a machine learning model trained from an exemplary dataset ("training dataset"). The training dataset may have been developed by asking a plurality of test subjects whether sample data corresponds to certain categories of information (e.g., such as by crowdsourcing questions as human intelligence tasks). For example, plurality of test subjects may be presented with data (e.g., text data, digital image, video, etc.) and asked whether the data corresponds to certain categories (e.g., "Does this image depict alcohol use?" "Does this social media post reflect bigotry?" "Does this video involve helping others?" etc.). The plurality of test subjects may also be asked to rate the strength of correspondence to the certain categories (e.g., "Please rate the severity of bigotry in this photograph from 1 to 10 (1 being mild bigotry and 10 being extreme bigotry)"). The data may be processed by an image-to-text or natural language processing algorithm, similar to the data conversion module 320, to produce a set of text labels or normalized data similar to the normalized data 324. The set of text labels or normalized data may be stored in conjunction with the answers provided by the plurality of test subjects, and the machine learning engine 326 may be trained on the stored data to determine correlations between the text labels/normalized data and the answers. The larger the training dataset and the more numerous and varied the plurality of test subjects are, the more accurate the correlations determined by the machine learning engine 326 may be.

For example, the machine learning model may determine that, for a given set of data, the frequency of text labels of images depicting alcohol use is 90% "adult," 90% "people," 60% "man," 60% "woman," 40% "recreation", 30% "indoors," 20% "beer," 20% "competition," 20% "beer," 20% "drink," 10% "alcohol," 10% "bar," 10% "bottle," and 10% "glass." Given an image that yields a combined set of text labels of "outdoors," "drink," "bottle," "man," "adult," and "recreation," a machine learning engine trained on such a set of data may determine that there is a 60% likelihood that the image depicts alcohol use.

In some cases, if the machine learning engine 326 is unable to determine that a certain text, image, or video corresponds to a selected filter beyond a threshold likelihood, one or more quality assurance technicians may be prompted to render the final decision. The output of the machine learning engine 326 may therefore include, for each of the media retrieved from the sites 308, an indication of probability that the media corresponds to one or more of the categories of the sensitivity classification settings. Media that does not have a probability above a threshold of corresponding to the one or more categories may be ignored as having insufficient relevance to the one or more categories.

The data output module 316 may be similar to the data output module 216 of FIG. 2. The data output module 316 or the machine learning engine 326 may filter the results output by the machine learning engine 326 according to the filters 318. That is, media that does not correspond to a category specified in the filters 318 may also be ignored as not being relevant to the user 302. Media that is determined by the machine learning engine 326 corresponds to an immutable category, such as media determined to raise ethnicity issues, religion issues, pregnancy issues, and so on, may be ignored by default unless the strength of association with certain other categories outweighs the immutable category issues. For example, if a social media comment is determined to involve religion (and immutable category) but is also determined to involve a high level (e.g., above a certain threshold) of bigotry, the bigotry may outweigh the religion issue and the social media comment may be flagged for review by the user. The data output module 316 may organize the results into the report 330 that displays the data flagged for review by the user, such as the example report 500 depicted in FIG. 5.

FIG. 4 illustrates an example interface 400 of an embodiment of the present disclosure. Specifically, FIG. 4 depicts the example interface 400 as including a plurality of filters (also referred to as filters, such as the filters 318 of FIG. 3) that correspond to criteria for screening an individual (also referred to as SCS). The user, such as the user 302 of FIG. 3, may select from a variety of filters that indicate criteria against which to screen the individual. The filters may be characteristics or categories of conduct for which the individual is to be screened. The filters may be categorized into bad filters 402 and good filters 404. The filters may be weighted according to weights 406. In some implementations, the example interface 400 includes the ability for the user to add custom filters. For example, the user may enter the name of a particular university football team name, or other custom filter in a custom text box for the good filters 404 or bad filters 402. Custom filters may not necessarily be good or bad, but can simply provide information in the form of structuring unstructured content. For example, a university football team name may not be good or bad, just simply present and relevant.

The bad filters 402 may reflect undesirable behavior or negative characteristics against which the user seeks to screen the individual. In the example interface 400, it can be seen that the user has selected "bigotry," "language" (e.g., profanity), and "violence," as filters to screen the individual against. The good filters 404 may be desirable behavior or preferred characteristics for which that the user seeks to screen the individual. In the example interface 400, it can be seen that the user has selected "protecting others" and "volunteering," as desirable behavior that the user seeks to screen the individual for. In this manner, the user can specify the categories that they care about in screening the individual, and avoid behaviors that are irrelevant to the decision-at hand; that is, in the example interface 400, the user has made the decision not to screen the individual for "donation" (e.g., charity), "helping others," "alcohol," "drugs," or "sex." This offers the end-user both the benefits of productivity but also the ability to remain compliant with an internal corporate policy or any number of enforced regulations that govern a user's access to a person's particular types of behavior and characteristics; an example would include a user's desire to avoid any reference to a person's race, gender, or disability.

The weights 406 may reflect a level of importance that the user attributes to the filters. In the example interface 400, the user has attributed a weight of 100 to "bigotry" and "volunteering," a weight of 96 to "protecting others," a weight of 95 to "violence," and a weight of 15 to "language," indicating that to the user, bigotry and volunteering are the most important of the selected filters, while language is the least important. It must be noted, that the example interface 400 is illustrative, and an actual implementation of a user interface can include some, all or none of the elements shown in the example interface 400. For example an implemented interface may or may not include the good filters 404, the filters may be different, or more or fewer than the filters depicted in FIG. 4, and not all implemented interfaces may have user-adjustable weights 406.

In some embodiments, the filters selected or specified by the user are stored persistently (e.g., in the SCS storage 312 of FIG. 3), and the same filters may be used as criteria for screening multiple individuals. For example, the filters may be filters that a client (e.g., a corporation, partnership, firm, etc.) of the system of the present disclosure considers important in screening prospective job applicants. The user in this example may be one of several human resource employees authorized to use the system of the present disclosure to screen various prospective job applicants. In some cases, only certain users of the client may be authorized to change or set the filters, and users without this authorization may be unable to view the filters or may be able to view the filters but not modify the filters.

Techniques described in the present disclosure may be used in other implementations as well. For example, in some embodiments, the system stores a record of successful (e.g., hired) and/or unsuccessful (e.g., not hired) job applicants for a particular job description or job code at the company of the user. As new applicants are screened, a machine learning engine such as the machine learning engine 326 of FIG. 3 may perform comparative analytics by comparing a new applicant with previous applicants to determine whether the new applicant has a profile most similar to previous successful applicants or previous unsuccessful applicants. The result of the comparison may be provided to the user in a report in a user interface, such as the report 500 of FIG. 5. As noted, the system may store records of individuals as well as the results of screening (e.g., the text labels in a structured dataset), which may be used in an updated machine language model to screen for other data points to give a better sense of how individuals' characteristics intersect. For example, even though "accountant" may not currently be a filter (favorable or unfavorable), data may be collected about an individual and such a filter may be implemented at a later date.

In another embodiment, techniques of the present disclosure may be utilized for recruiting. For example, for a given job position a user may specify a set of filters. The user may use the screening system of the present disclosure to screen individuals with profiles on a job seeking site in order to identify individuals whose online activity best fits the flags/filters specified by the user. In another embodiment, the screening system of the present disclosure may be used to screen expert and lay witnesses for court trials. That is, filters may be specified by the user in screening the witness to determine whether the witness has bad filters that could indicate problems with credibility (e.g., truthfulness) in a trial. In another embodiment, the screening system of the present disclosure may be used to screen plaintiffs and/or defendants for asset profiling, determination of whether disability claims are legitimate (e.g., did the individual "tweet" about playing sports during a time the individual was claiming to be injured), and so on.

In another embodiment, the screening system of the present disclosure may be used for marketing to consumers. The screening system may accomplish this by analyzing and labeling all unstructured content in a person's publicly available, online identity/activity and examining a cluster of purportedly likeminded individuals in aggregate. The combination of topics of labels that exist in a person's online persona may comprise a plurality of social characteristics that can be difficult to visualize, but common factor can be revealed through the unique labeling provided by the system. For example, if a plurality of individuals identifies themselves as buyers of a certain brand of cola, the machine learning model may be used to determine other common characteristics of those buyers; for instance, if it is determined through screening individuals that buyers of a particular cola also tend to play a particular sport, it may present various marketing opportunities for either the producer of the particular cola or for sport equipment companies. Note that the previous example is a simplified example for illustrative purposes, and that the machine learning model may be used to identify several similarities between individuals based on various combinations of characteristics. In this manner, a single individual can be benchmarked against a broader group of individuals, using a plurality of social characteristics as the form of comparison. For example, the screening system may identify ten individuals as similar because they have posted, with similar frequency or over a similar period of time, on about the same number of related topics.

In still another embodiment, the screening system of the present disclosure may be used in a dating service. For example, users of a dating service may specify good and/or bad filters (such as the filters shown in FIG. 4) and, the users may screen online activity of potential dating matches (i.e., other individuals having profiles with the dating service) based on the selected/specified filters. Additionally or alternatively, the user may view individuals that have been grouped together according to a particular combination of characteristics, the determination of which may be based on the specific labeling of the unstructured content. The users may view the results in an interface similar to the interface shown in 5. In this manner, the dataset of the system may be used to create a distinct profile that fits a plurality of individuals, based on similar social characteristics, and which can be used by the system to identify other individuals that also fit the profile.

Another embodiment of the present disclosure may be for screening sellers or resellers of goods or services. For example, if the user sees an item for sale in a marketplace (e.g., eBay, Craigslist, Amazon Marketplace, etc.) by a seller whom the user is unfamiliar with, or if the user is a proprietor of a marketplace and a new seller seeks to sell goods or services in the user's marketplace, the user may provide details about the seller (e.g., seller username, name of the seller's marketplace or business, telephone number of the seller, email address of the seller, location of the seller, etc.) as key attributes, may specify filters/criteria (i.e., flags) that the user considers important to making a decision whether to purchase from the seller, and cause the system of the present disclosure to search for and analyze information about the seller. As an example, the user may specify filters of "late delivery," "prompt delivery," "defective product," "unresponsive," and "restocking fee," and the system of the present disclosure may search various online sources for descriptions, reviews, Better Business Bureau reports, news articles, search engines, and so on for relevant data. The machine language engine*326 may output data that is flagged as corresponding to the filters, which may be presented to the user so the user can make a decision whether to purchase from or approve the seller, as the case may be.

FIG. 5 illustrates an example report 500 of an embodiment of the present disclosure. Specifically, FIG. 5 depicts a prospective candidate report for a candidate, "Jane Doe," for a job opening. The screening system of the present disclosure, such as the screening system 102 of FIG. 1, has identified eight "flags" that have been determined to be highly relevant (e.g., calculated relevance above a threshold) to the criteria (e.g., per the sensitivity classification settings) specified by the user that initiated the evaluation of the prospective candidate.

The example report 500 may begin with personally identifiable information 502 about the individual. For example, the example report 500 shows that the individual's name is "Jane Doe," she resides in "Anytown, USA," and is currently employed at "Acme Corporation." The example report 500 may give a summary 504 of the results, which in this case is that the screening system has identified eight flags from five sources. The example report 500 may provide statistical analyses 506, such as that "35% of the candidates with this many flags or more are rejected." These statistical analyses may encompass additional visualizations, such as bar graphs and pie charts, and may be grounded in a variety of attributes that exist within the system about Jane Doe.

The example report 500 breaks the flags into four categories 508: posts, media, social graph associations, and search results. In this example, the post category may be data where the individual has specifically posted on an internet site. Data types that may be included in the post category include status updates, check-ins (to places), pictures, videos of interest, and so on. In this example, the media category may be for data that has been posted by someone else, but the individual in question is mentioned or present in the media. Data types that may be included in the media category may include videos taken by friends or pictures taken by photographers at a party.

Further in this example, the social graph associations category may refer to data indicating that the subject has specifically associated him or herself with a "flag-causing entity" (e.g., controversial public figure or subject matter). Data types that may be included in the social graph associations category may include "giving a shoutout" on a controversial subject, "liking" a celebrity with a sordid past, or joining a controversial group. Also in this example, the search results category may refer to data found in a search performed on a specific subject. Such data types may include search engine results and news articles.

In the example report 500, the user may interact with the content. That is, the content (e.g., copies of the posts, images, search results, favorable pictures, etc.) may be displayed by clicking (or otherwise selecting by an input device, such as a keyboard, mouse, or touch screen) on the categories. The content may be displayed with key flagged portions of the content highlighted with an explanation about why the key flagged portions were considered relevant. In some cases, the report may include hyperlinks to a webpage that contains the actual content. In some implementations, a level/ranking (e.g., rating 1 to 5, 1 to 10, high to low, etc.) of strength of the flagged category is also noted (e.g., "bigotry level 4," "bigotry level 2," "drug use level 5," etc.). For example, a digital image of an individual who appears to be present at an anti-Semitic rally may receive a lower level of bigotry than a digital image showing an individual having a swastika tattooed on his/her arm.

The decision buttons 510 may be controls with which the user can interact to indicate a decision regarding the individual indicated by the personally identifiable information 502. Note that the example report 500 is intended to be illustrative only, and a report in an actual implementation may include some, all, additional, or none of the features of the example report 500 depicted in FIG. 5. For example, additional or alternative controls to the decision buttons 510 may be present, controls may be graphical, textual, animated or other suitable controls, there may be more or fewer categories 508 than those shown in the example report 500, the statistical analyses 506 may be enhanced or may not be present, and so on.

Figure 6:
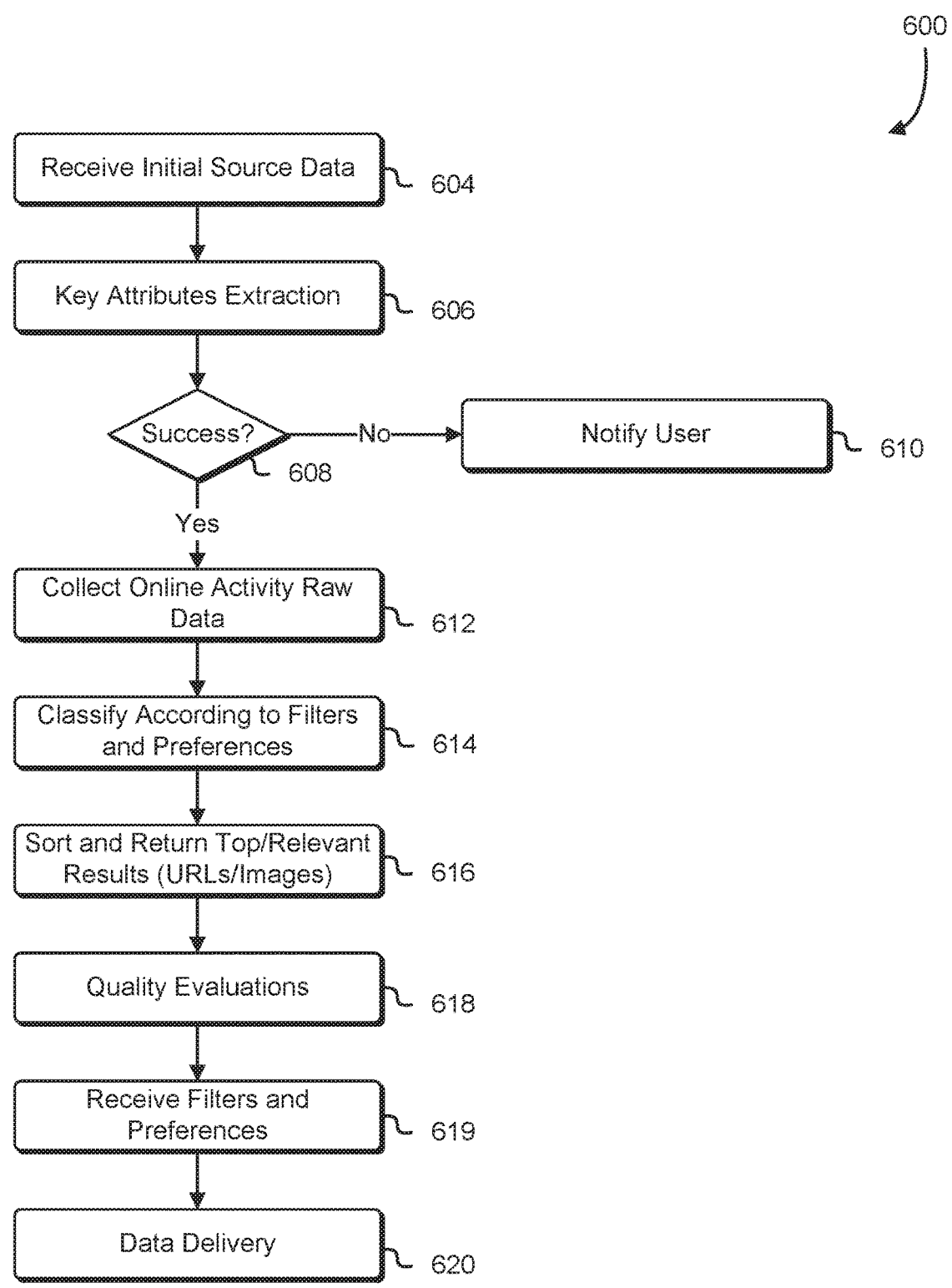
FIG. 6 is a flowchart illustrating a process for data searching and analysis in accordance with the present disclosure.

A process of the screening system is summarized in the flowchart of FIG. 6 and described in detail below. FIG. 6 is a flowchart illustrating an example of a process 600 for screening an individual in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). Some or all of process 600 may be performed, for example, by any suitable system such as the computing device 900 described in conjunction with FIG. 9. The process 600 includes a series of operations wherein a user specifies filters, uploads initial source data from which key attributes are extracted, online activity is collected and classified according to specified filters, flagged subject matter is sorted and delivered in a report such as to an interface on a display of a device of the user.

In 604, the system receives the initial source data containing key attributes for identifying the individual as the subject of the search and analysis. For example, the system may receive as initial source data a résumé of a job applicant. Alternatively, a user may provide the initial source data such as through filling out an online form or other interface to the system performing the process 600. In still other examples, as described in the present disclosure, it is contemplated that some implementations focus on finding candidates for jobs or jobs for a specific candidate, in which case a job description or list of skills/experience may be the initial source data. The system may parse, identify, and extract a set of key attributes from the initial source data.

In 606, the system determines a set of key attributes from the initial source data. In some examples, the term "key attributes" may refer to personally identifiable information (PII) that can be used on its own or in combination with other information to identify an individual associated with a set of data. For example, key attributes that may be extracted from the initial source data may include a first name (also referred to as a given name), a middle name or middle initial, a last name (also referred to as family name), job title, location (e.g., address, city, state, postal/ZIP code, etc.), phone number, identifier for a mobile device, Internet Protocol (IP) address, employer name, email address, and so on. The extracted set of key attributes may be referred to in the present disclosure collectively as SRD. As noted, the initial SRD may be extracted from a résumé or other document in any of a variety of formats, including Microsoft Word format, Adobe Acrobat format, eXtensible Markup Language (XML), raw text, or other applicable format. Various methods of identifying the key attributes from other data within the initial source data are contemplated, such as parsing the initial source data for an "@" character (which may indicate an email address), parsing the initial source data for two sets of three numerical digits followed by a set of four numerical digits separated by non-alphanumeric characters (which may indicate a phone number), position of the data in the initial source data (e.g., a name in a résumé is more likely to be at the top of the page), or occurrence of common/known names (e.g., "Morgan," "Tracy," "Peyton," "Jones," "Smith," etc.).

In 608, if the system is unable to determine certain key attributes from the initial source data (e.g., given and family name or email address, etc.), in some implementations, in order to proceed, the system requires a certain number or certain types of key attributes to be extracted. In other implementations, weights are associated with the key attributes, and different types of key attributes have different weights (e.g., an email address may be weighted more heavily than a family name) and a sum of the weights may be required to exceed a threshold before the system may proceed. For example, a full name (e.g., a given name and a family name) may be assigned a weight of 100, an email address may be assigned a weight of 100, the name of a current employer may be assigned a weight of 95, a job title (e.g., "Software Engineer," "Director of Marketing," "Editor," etc.) may be assigned a weight of 90, a location (e.g., street address and city and state or postal code) may be assigned a weight of 85, work history may be cumulatively assigned a weight of 70, and so on; a greater weight in these examples indicating more importance in identifying, with a sufficient degree of accuracy, the social media profiles and webpages that offer a clear chain of custody to the individual corresponding to the initial source data. In some examples, the term "chain of custody" may refer to the ability of the system to determine that found data (e.g., social media profile, search result, image, etc.) corresponds to a threshold amount of accuracy to the initial source data. It is also contemplated that other methods of weighting and other values for weights may be used. Furthermore, it is contemplated also that other methods of determining whether sufficient key attributes have been extracted may be used in 608.

In an event where insufficient key attributes are determined, the system may proceed to 610, whereupon the system may notify the user that the initial source data is unreadable or contains data from which sufficient key attributes can be extracted. The system may log this result in a log file or table, and/or may prompt the user to input different or more information, whereupon the system may repeat the process of 606-08 to determine whether sufficient key attributes can be extracted.

In 612, the subject recognition data and sensitivity classification settings having been input, and the system may collect online activity raw data in the data retrieval portion of the process. The online activity raw data may be retrieved by using a variety of application programming interface calls, scripts, and web-based collection methods to obtain online activity raw data from available sources (e.g., one or more Internet search engines, websites, social media sites, etc.). The raw data may include social media profiles, search results, and raw data sources tied to the set of key attributes (e.g., individual's e-mail address, phone number, etc.) extracted from the initial source data in 604-06. Examples of sources of raw data are Google, Google+, Yahoo! search, Facebook, Twitter, Instagram, LinkedIn, Foursquare, YouTube, Pinterest, Reddit, MySpace, Blogger, WordPress, LiveJournal, Flickr, Photobucket, Yelp, and so on.

The data retrieved may be in the form of images, videos, texts, representations of posts, tweets, comments, indications of emotion (e.g., emoticons, emoji, "likes," "pokes," etc.), and so on. The data retrieved may be determined to be associated with the individual with acceptable certainty based on a number and type of key attributes found to be associated with the data. For example, a social media profile that matches a full name and location of the individual identified by the key attributes may be determined, based at least in part on the weights of the attributes, to have sufficient certainty that the profile belongs to the individual in question. On the other hand, a match to the full name but a mismatch to the location may be determined not to have sufficient certainty that the profile corresponds to the individual in question. A mismatch of data may be associated with a negative weight, whereas the lack of a match may be associated with zero weight. For example, given key attributes of a full name of "John L. Jones" located in Seattle, Washington, a profile corresponding to a "John L. Jones" located in Seattle, Washington may have a weight of 185. A profile corresponding to "John L. Jones" with no specified location may only have a weight of 100. On the other hand, a profile corresponding to "John L. Jones" located in Paris, Texas, on the other hand, may only have a weight of 15. A partial match to a key attribute may receive a partial weight; for example, a profile corresponding to a "John L. Jones" located in Washington, but in Tacoma rather than Seattle, may be assigned a weight of 140.

Additionally or alternatively, the system performing the process 600 may utilize machine learning algorithms, pattern matching, or some combination to determine that the obtained data corresponds to the individual associated with the set of key attributes. Such machine learning techniques may include supervised learning techniques, unsupervised learning techniques, semi-supervised learning techniques, transduction or transductive inference techniques, reinforcement learning, developmental learning, and the like. In various embodiments, the data is analyzed using one or more machine learning algorithms, such as: decision trees, association rule learning, deep learning, inductive logic programming, support vector machines, cluster analysis, Bayesian networks, naïve Bayes classifiers, learning automata, Gaussian process regression, nearest neighbor, random forest, ordinal classification, k-means clustering, lazy learning, artificial neural network, or generally any suitable machine learning algorithm or combination of algorithms. The system may determine that the data corresponds to the individual in this manner within a statistical significance of certainty (e.g., two-sigma), whereas the accuracy of statistical significance may be defined by the user. Additionally, if the results cannot be determined within a specified statistical certainty, the information may be partitioned into a plurality of nodes of information, and the system may perform a graph traversal analysis of the nodes of the information and the relationships between the nodes. In some embodiments, if the system cannot determine a relationship between data with specified certainty, the system utilizes crowdsourcing, such as private employees, contractors, or a crowdsourcing service (e.g., Amazon Mechanical Turk) to make a final determination (e.g., to determine if an individual in two different pictures belong to the same person).

In 614, from this online activity raw data, the system identifies relevant data based on the sensitivity classification settings (e.g., the flags shown in FIG. 4). Additionally, machine learning algorithms and/or one or more pattern matching algorithms, as described above, may be utilized to filter out irrelevant data. For example, as described in the present disclosure, an image may be processed into text by object recognition software, and an image that a machine learning algorithm determines contains the contents that could raise issues with the FCRA or the EEOC (for example, determines that the image indicates religious affiliation) but does fit any overriding filters (e.g., violence, sex, bigotry, etc.) may be discarded. Whereas, an image or video determined to not raise issues with the FCRA or the EEOC or determined to fit an overriding filter, may be retained as relevant. Data deemed relevant may be retained in memory or in persistent storage at least temporarily for further processing, while data that is deemed irrelevant according to the sensitivity classification settings (i.e., not matching one or more of the sensitivity classification settings) may be ignored, discarded, or overwritten.

In 616, the system may sort the results (e.g., text, images, videos, etc. deemed relevant in 614) into an order based on the weights of the sensitivity classification settings. Results that do not meet a specified threshold for relevance may be discarded. Results that meet the specified relevance may be organized into a report for presentation to the user, such as the example report 500 of FIG. 5.

In 618, data that the system could not definitively categorize may be presented to a quality assurance technician for a final determination. For example, if the operations of 612-16 are unable to make a determination with confidence above a particular threshold whether an individual in a picture is smoking a cigarette versus an illegal substance, the image may be presented to a quality assurance technician for final determination whether the image is relevant to the sensitivity classification settings. As another example, if the individual "liked" an article pertaining to a controversial public figure, a quality assurance technician may be sought to determine the nature of the article (e.g., whether the article is favorable or unfavorable toward the controversial public figure) and whether the "like" by the individual is relevant in to the sensitivity classification settings.

In 619, a user inputs a set of filters, rules, or preferences that the system will use to determine the relevance of portions of data extracted in the operations of 612-14. This input may set up "top level categories" that may serve as baseline rules for classifying the online activity data. These rules may be customized on a client-by-client (or instance by instance) basis. The user can also specify which of these filters are most important (e.g., by weight or by reordering a list of filters) and specify the order in which categories of data are to appear in the resulting reports. Examples of top level categories include bigotry/sexual discrimination references, illegal drug references, sexuality/explicit profanity, alcohol, and violence. It must be noted, that such categories relevant to the user need not be categories that are undesirable. That is, categories may also include favorable categories such as evidence of volunteering, protecting others, charity, and so on. The system may also allow the user to set custom categories and assign weights to various categories according to the user's preference. For example, if it is relevant for the decision-making, the user may customize the sensitivity classification settings to specify a sports team, an alma mater, certain hobbies, and so on. For further details see FIG. 4.

The system also may include hidden or immutable rules to mitigate the risk of presenting the user with information that could raise issues with the Fair Credit Reporting Act (FCRA) and the Equal Employment Opportunity Commission (EEOC). For example, certain excluded categories of information may pertain to age, disability, genetic information, gender, marital status, sexual preference, pregnancy, ethnicity, health status, religious affiliation, or other category associated with a protected class of individual. The system may not permit the user to modify or remove rules of this type; however, if certain retrieved data is associated with multiple categories, one of which is an excluded category, depending on weight or strength of the association, a non-excluded category may override an excluded one. For example, an image of a pregnant individual may normally be excluded, but if the pregnant individual is holding a firearm and threatening violence, which have been selected as "bad filters," the system may determine that fact that the individual is pregnant is outweighed by the presence of the firearm and violence in the image. Note too that the operations need not be specifically performed between 618 and 620; rather, the user may input the set of filters, rules, or preferences at any of a variety of points during the process 600 (e.g., before 604, between 616 and 618, etc.). For example, after the results are delivered to the user in 620, the user may modify the set of rules, filters, or preferences (other than the immutable filters described above), which may cause the operations of 614-620 to reprocess the collected data using the modified rules, filter, or preferences.

In 620, the results are organized into a report that may be presented in a visual, easy-to-read, comprehensive report, such as in a web-based dashboard and/or control panel similar to the example report 500 of FIG. 5. Thereafter, the user may further determine the relevance of the various results and/or make decisions based on the results presented in the report. The report may come in a variety of forms, such as a visual timeline organized in accordance with a severity/relevance of the flagged data (e.g., in accordance with weights of the security classification settings), a visual timeline showing the flagged data in chronological order, an enterprise dashboard displaying individual flagged data within a specified time range or sensitivity classification setting, integrated within an existing dashboard (e.g., an applicant tracking system, background check platform, talent management suite, or some other people management system (PMS)), or some other such form.

Note that one or more of the operations performed in 604-20 may be performed in various orders and combinations, including in parallel. Note also that one or more of the operations performed in 604-20 need not be present in every implementation of the system of the present disclosure. For example, in some implementations, the accuracy of the machine learning and pattern matching algorithms is such that no quality assurance evaluations of 618 are necessary, or alternatively, in some implementations, if there is any doubt as to whether data is relevant, the system errs on the side of "irrelevant," thereby rendering the operations of 618 unnecessary. As another example, multiple individuals may be screened simultaneously by performing the process 600 for each individual in parallel with each other.

Figure 7:
FIG. 7 is a flowchart that illustrates an example of obtaining data from a data source in accordance with an embodiment.
Figure 7:
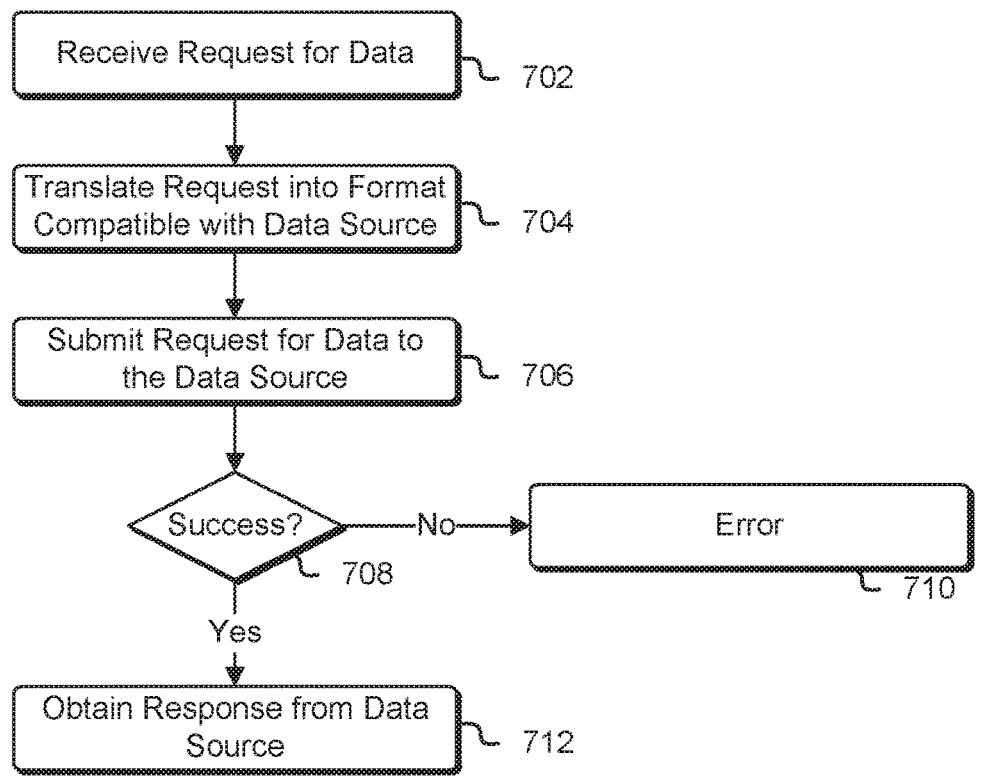

FIG. 7 is a flowchart illustrating an example of a process 700 for obtaining data from an (online) data source in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). Some or all of process 700 may be performed, for example, by any suitable system such as the computing device 900 described in conjunction with FIG. 9. The process 700 includes a series of operations wherein a request for data is received, such as a screening process (e.g., the process 600 of FIG. 6) having been initiated by a user, translating data in a format compatible with the data source, authenticating with the data source, and obtaining the response from the data source. The process 700 reflects in more detail the operations of 612 of FIG. 6 and may be performed by a component of the data analysis module, such as the data retrieval module 328 of FIG. 3.

In 702, the system performing the process 700 receives a request to obtain data from the data source. The data source may be a website, a search engine site a social media site or other site similar to the sites 308 of FIG. 3, the request may be a request from a computing device of the user to retrieve data that may be associated with an individual being screened. The request may be received as a result of a user, such as the user 302, initiating a screening process, such as the screening 600 of FIG. 6 for the individual.

In 704, the system transforms the request into a format that's compatible for retrieving data from the data source. For example, the request may be transformed into one or more parameter values submitted to an API of the data source via an API call. As another example, the request may be transformed into one or more search terms which may be input to a search engine of the data source. As still another example, the request may transformed into a structured language query which may be submitted to a database of the data source. The request may include one or more key attributes from a set of key attributes corresponding to the individual being screened.

In 706, the system submits the formatted request to the data source. In addition, the system may authenticate with the data source. It is contemplated that for publicly available data, authentication with the data source may be unnecessary and the step of authentication may be omitted from the operations of 706-10. The system may authenticate with the data source by providing proof of possession of credentials to the data source. For example, the system may supply, as proof of possession of credentials corresponding to the system, information sufficient to prove access to the credentials, such as a password, a cryptographic hash/digest of the password, cryptographic digital signature generated by a signing encryption key, or other secret key verifiable by the data source for authorizing the identity of the system.

In 708, the system performing the process 700 determines whether authentication with the data source has been successful or not. For example, if the system receives an error after providing the proof of credentials in 706, the system may retry or abort the retrieval of the data from the data source by proceeding to 710, whereupon the system may return an error. The error may be returned to another component of the system rather than to the user, and the result of the error may be that the data source is omitted from the list of data sources from which the data is obtained to screen the individual.

Otherwise, if submission of the request made in 706 is successful, in 712, the system may receive a response from the data source that includes the data sought (i.e., that matches the key attributes submitted to the data source). As noted in the present disclosure, the data may be received in any of a variety of disparate data types; that is, not only may the data be obtained as text data, digital image data, video data, audio data, and so on, but each media type may be received in a different format. For example, text results received from one search engine may be structured differently from text results received from a different search engine. As another example, documents may be received in Microsoft Word format, Microsoft Excel format, or Adobe Portable Document Format (PDF). As still another example, video data or audio data may be encoded with any of a variety of codecs. In yet another example, image data may be received as a portable network graphics (PNG) format, graphic interchange format (GIF), Joint Photographic Experts Group (JPEG) format, or tagged image file (TIF) format, and so on. As described in the present disclosure data obtained, regardless of the supported media type, the media may be transformed into a structured data structure usable by a machine learning engine, such as the machine learning engine 326 of FIG. 3, for screening the individual. Note that one or more of the operations performed in 702-12 may be performed in various orders and combinations, including in parallel.

Figure 8:
FIG. 8 is a flowchart that illustrates another example of obtaining data from the data source in accordance with an embodiment.
Figure 8:
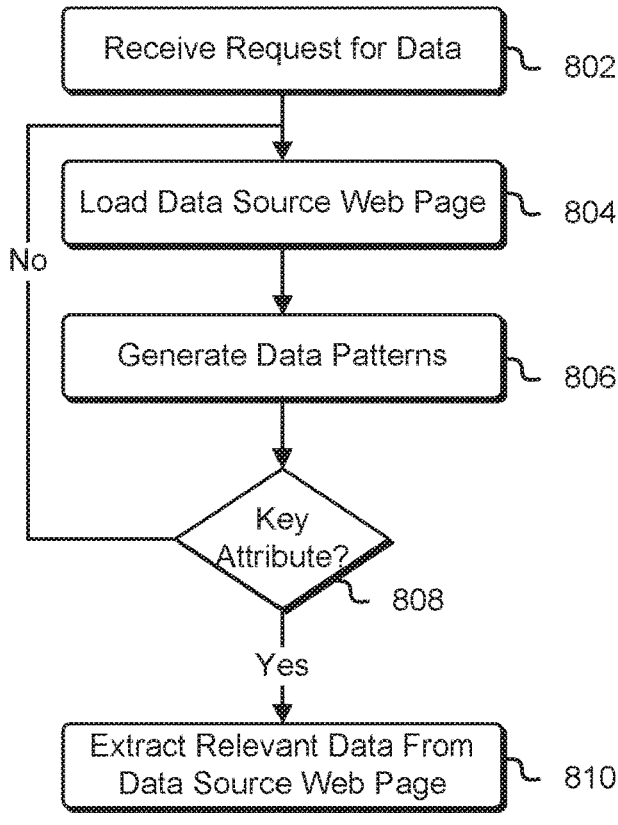

FIG. 8 is a flowchart illustrating an example of a process 800 for obtaining data from an (online) data source in accordance with various embodiments. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). Some or all of process 800 may be performed, for example, by any suitable system such as the computing device 900 described in conjunction with FIG. 9. The process 800 includes a series of operations wherein a request for data is received, a webpage of the data source is loaded, data patterns are detected, and relevant data is extracted from the webpage. The process 800 reflects in more detail the operations of 612 of FIG. 6 and may be performed by a component of a data analysis module, such as the data retrieval module 328 of FIG. 3. A difference between the process 800 and the process 700 of FIG. 7, is that the process 800 need not interface directly with the data source, and in that manner may obtain data from data sources having a public-facing webpage but not an application programming interface or other manner of directly requesting data from the data source.

In 802, the system performing the process 800 receives a request to obtain data from the data source. The data source may be a website, a search engine site a social media site or other site similar to the sites 308 of FIG. 3. The request may be a request from a computing device of the user to retrieve data that may be associated with an individual being screened. The request may be received as a result of a user, such as the user 302, initiating a screening process, such as the process 600 of FIG. 6 for the individual.

In 804, the system loads a webpage of the data source and can include loading the web page and initiating actions which cause more data to be dynamically loaded on said page. That is, the data source may have a webpage associated with an accessible address, such as a particular URI, uniform resource locator (URL), or IP address, and the system may direct an HTTP request (optionally include a GET or POST request information) to the address of the data source. In response, the system may receive sequence of text, HyperText Markup Language (HTTP), or XML data. In some cases the data may have hyperlinks or URIs to images and other data types, which may be retrieved from the location specified by the hyperlinks or URIs.

In 806, the system generates patterns which will be used to extract data from the webpage retrieved. Syntax corresponding to elements in the document unnecessary to the pattern matching (e.g., "<td>," "<div>," "<title>," etc.) may be removed, ignored, or used in the pattern matching; that is, text between such labels (e.g., between "<td>" and "</td>") may be identified as data to be extracted from the webpage and analyzed for relevance to the individual and/or specified filters in the manner described in the present disclosure.

In 808 the system may determine whether the webpage is associated with the individual being screened. For example, the patterns or contents of the webpage may be parsed for occurrences of one or more key attributes that were obtained from initial source data associated with the individual. If one or more key attributes are found, this may indicate a probability that the webpage is associated with the individual, and the number and type of key attributes found may be used to calculate (e.g., based on weights associated with different types of key attributes) a strength or probability of association.

In 810, the system may use the generated patterns to extract the relevant data from the webpage. The extracted data may be passed through a natural language processing algorithm to return a series of text labels. Likewise, images, videos, or other media may be passed through an image processing algorithm to likewise return a series of text labels as described above in conjunction with FIG. 3. Note that one or more of the operations performed in 802-08 may be performed in various orders and combinations, including in parallel. For example, the system may perform the operations 808 that determine whether the webpage is associated with the individual prior to the operations of 806.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 9:
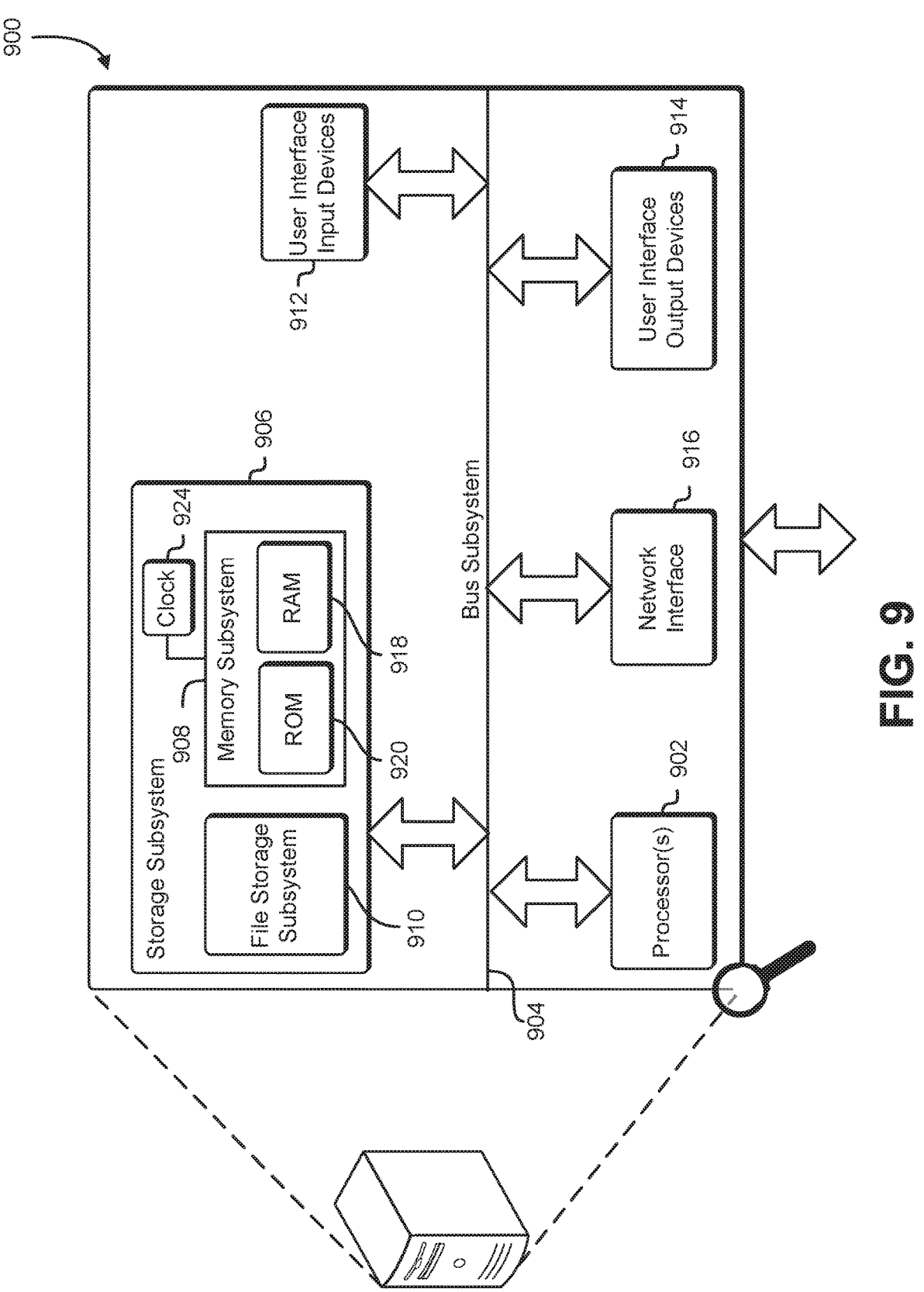
FIG. 9 illustrates an environment in which various embodiments can be implemented.

FIG. 9 is an illustrative, simplified block diagram of an example computing device 900 that may be used to practice at least one embodiment of the present disclosure. In various embodiments, the computing device 900 may be used to implement any of the systems illustrated and described above. For example, the computing device 900 may be configured for use as a data server, a web server, a portable computing device, a personal computer, or any electronic computing device. As shown in FIG. 9, the computing device 900 may include one or more processors 902 that may be configured to communicate with, and are operatively coupled to, a number of peripheral subsystems via a bus subsystem 904. The processors 902 may be utilized for the traversal of decision trees in random forests of supervised models in embodiments of the present disclosure (e.g., cause the evaluation of inverse document frequencies of various search terms, etc.). These peripheral subsystems may include a storage subsystem 906, comprising a memory subsystem 908 and a file storage subsystem 910, one or more user interface input devices 912, one or more user interface output devices 914, and a network interface subsystem 916. Such storage subsystem 906 may be used for temporary or long-term storage of information such as details associated with transactions described in the present disclosure, databases of historical records described in the present disclosure, and storage of decision rules of the supervised models in the present disclosure.

The bus subsystem 904 may provide a mechanism for enabling the various components and subsystems of computing device 900 to communicate with each other as intended. Although the bus subsystem 904 is shown schematically as a single bus, alternative embodiments of the bus subsystem may utilize multiple busses. The network interface subsystem 916 may provide an interface to other computing devices and networks. The network interface subsystem 916 may serve as an interface for receiving data from, and transmitting data to, other systems from the computing device 900. For example, the network interface subsystem 916 may enable a data technician to connect the device to a wireless network such that the data technician may be able to transmit and receive data while in a remote location, such as a user data center. The bus subsystem 904 may be utilized for communicating data, such as details, search terms, and so on to the supervised model of the present disclosure, and may be utilized for communicating the output of the supervised model to the one or more processors 902 and to merchants and/or creditors via the network interface 916.

The user interface input devices 912 may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include various possible types of devices and mechanisms for inputting information to the computing device 900. User interface output devices 914 may include a display subsystem, a printer, or non-visual displays such as audio output devices, etc. The display subsystem may be a cathode ray tube (CRT), a flat-panel device such as a liquid crystal display (LCD), light emitting diode (LED) display, audio speakers, or a projection or other display device. In general, use of the term "output device" is intended to include various possible types of devices and mechanisms for outputting information from the computing device 900. The output device(s) 914 may be used, for example, to present user interfaces to facilitate user interaction with applications performing processes described and variations therein, when such interaction may be appropriate.

The storage subsystem 906 may provide a computer-readable storage medium for storing the basic programming and data constructs that may provide the functionality of at least one embodiment of the present disclosure. Applications (programs, code modules, instructions), when executed by one or more processors, may provide the functionality of one or more embodiments of the present disclosure, and may be stored in the storage subsystem 906. These application modules or instructions may be executed by the one or more processors 902. The storage subsystem 906 may additionally provide a repository for storing data used in accordance with the present disclosure. The storage subsystem 906 may comprise a memory subsystem 908 and a file/disk storage subsystem 910.

The memory subsystem 908 may include a number of memories including a main random access memory (RAM) 918 for storage of instructions and data during program execution and a read only memory (ROM) 920 in which fixed instructions may be stored. The file storage subsystem 910 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The computing device 900 may include at least one local clock 924. The local clock 924 may be a counter that represents the number of ticks that have transpired from a particular starting date and may be located integrally within the computing device 900. The local clock 924 may be used to synchronize data transfers in the processors for the computing device 900 and various subsystems included to specific clock pulses and may be used to coordinate synchronous operations between the computing device 900 and other systems in a data center. In one embodiment the local clock 924 is an atomic clock. In another embodiment, the local clock is a programmable interval timer.

The computing device 900 may be of various types including a portable computer device, tablet computer, a workstation, or any other device described below. Additionally, the computing device 900 may include another device that may be connected to the computing device 900 through one or more ports (e.g., USB, a headphone jack, Lightning connector, etc.). The device that may be connected to the computing device 900 may include a plurality of ports configured to accept fiber-optic connectors. Accordingly, this device may be configured to convert optical signals to electrical signals that may be transmitted through the port connecting the device to the computing device 900 for processing. Due to the ever-changing nature of computers and networks, the description of the computing device 900 depicted in FIG. 9 is intended only as a specific example for purposes of illustrating the preferred embodiment of the device. Many other configurations having more or fewer components than the system depicted in FIG. 9 are possible.

The specification and drawings are, accordingly, to be regarded in an illustrative rather than a restrictive sense. It will, however, be evident that various modifications and changes may be made without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover various modifications, alternative constructions and equivalents falling within the spirit and scope of the invention, as defined in the appended claims.

The use of the terms "a," "an," "the," and similar references in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes various modifications and equivalents of the subject matter recited in the claims appended hereto as permitted by applicable law. Moreover, any combination of the above-described elements in a variety of possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety within the present disclosure.

What is claimed is:

1. A computer-implemented method, comprising:

obtaining a relevant data preference indicating a category of data that is relevant for a search result;

extracting a key attribute from initial source data corresponding to an individual, the key attribute being personally identifiable information usable to identify additional information that is associated with the individual;

obtaining, based at least in part on the key attribute, the additional information from an online source associated with the individual, wherein the additional information includes at least one digital image;

transforming, at least in part by performing object recognition on the at least one digital image, the additional information that includes the at least one digital image into a first structured dataset comprising a plurality of fields, the first structured dataset selected from a plurality of structured data sets based on at least a type of the online source, wherein individual structured datasets of the plurality of structured datasets comprise at least one first field of the plurality of fields that identifies the type of the online data source and at least one second field of the plurality of fields that contains data specific to the type of the online data source of the individual structured dataset;

determining to an amount of statistical certainty, at least in part by passing the first structured dataset as input to a machine learning algorithm, that the additional information is associated with the category of data, the machine learning algorithm having been previously trained with prior inter-rater agreements on the category of data;

generating the search result indicating, based at least in part on the amount of statistical certainty, that the at least one digital image is associated with the category of data; and providing the search result in a user interface.

2. The computer-implemented method of claim 1, wherein obtaining the additional information includes:

calling, using the key attribute as a parameter value, an application programming interface to the online source; and receiving, as a response, the additional information.

3. The computer-implemented method of claim 1, wherein:

the category is associated with a weight that indicates a level of importance of the category; and the search result is further generated based at least in part on the weight associated with the category.

4. The computer-implemented method of claim 1, wherein obtaining the relevant data preference includes receiving, via selection of the category of data from a user interface, a request to identify online activity associated with the individual that corresponds to the category of data.

5. A system, comprising:

one or more processors; and memory including instructions that, as a result of execution by the one or more processors, cause the system to:

receive a selection of a screening priority for screening an individual;

extract an attribute from source data that is associated with the individual;

obtain, based at least in part on the attribute, unstructured data associated with the individual from an online source, the unstructured data including a digital image;

transform the unstructured data including the digital image into a structured dataset, the structured dataset selected from a plurality of structured data sets based on a type of the online source, the structured dataset comprising a data field that corresponds to the type of the online data source;

make a determination, at least in part by passing the structured dataset to a machine learning algorithm, within an amount of statistical certainty that the digital image is associated with the screening priority; and output the determination to a user interface.

6. The system of claim 5, wherein:

the attribute is associated with a weight; and the instructions further include instructions that cause the system to:

calculate, based at least in part on the weight, a probability that the unstructured data is associated with the individual; and determine, based at least in part on the probability calculated being a value relative to a threshold, that the individual is associated with the unstructured data.

7. The system of claim 5, wherein:

the system is provided to a user as a job applicant screening service; and the instructions are executed in response to the user submitting a request to screen the individual as a prospective job applicant.

8. The system of claim 5, wherein:

the source data is a document that presents details on a background of the individual; and the instructions further include instructions that cause the system to parse the document to identify the attribute; and extract the attribute from the document.

9. The system of claim 5, wherein the machine learning algorithm is trained from a set of training data, the set of training data obtained by collecting inter-rater agreements between a plurality of individuals judging particular target data.

10. The system of claim 5, wherein the instructions further cause the system to:

store the structured dataset in persistent storage with a plurality of structured datasets; and retrain the machine learning algorithm at least in part from the plurality of structured datasets.

11. The system of claim 5, wherein the instructions that cause the system to transform the unstructured data include instructions that cause the system to:

obtain, by passing at least a portion of the unstructured data as input to a visual recognition application, one or more text labels that describe contents of the unstructured data; and generate the structured dataset at least in part from the one or more text labels.

12. The system of claim 5, wherein the unstructured data further includes one or more of:

a check-in, digital audio data, or digital video data.

13. A non-transitory computer-readable storage medium having stored thereon executable instructions that, as a result of being executed by one or more processors of a computer system, cause the computer system to at least:

train, based on inter-rater agreements on whether historical data corresponds to a category of conduct, an algorithm to identify the category of conduct in a plurality of disparate forms of data, the plurality of disparate forms including digital image data;

obtain an attribute associated with an individual being screened;

obtain, based at least in part on the attribute, a first set of data associated with the individual from an online data source, the first set of data corresponding to the digital image data, wherein the online data source comprises at least one of a social media site, a website, or a search engine;

obtain, based at least in part on the attribute, a second set of data associated with the individual, the second set of data corresponding to another of the plurality of disparate forms;

transform the first set of data that at least corresponds to the digital image data and the second set of data into a standard data structure determined from a plurality of standard data structures based at least in part on the online data source;

input contents of the standard data structure to the algorithm;

receive a result from the algorithm that indicates that the first set of data associated with the individual is associated with the category of conduct; and output the result to a user interface.

14. The non-transitory computer-readable storage medium of claim 13, wherein:

the computer system is a computer system of a background investigation service; and the executable instructions are executed in response to a request from a user of the background investigation service requesting to investigate a background of the individual.

15. The non-transitory computer-readable storage medium of claim 13, wherein:

the computer system is a computer system of a dating service; and the executable instructions are executed in response to a request from a client of the dating service requesting to screen the individual as a potential dating match for the client.

16. The non-transitory computer-readable storage medium of claim 13, wherein the executable instructions further cause the computer system to:

obtain source data associated with the individual from a user; and extract the attribute from the source data.

17. The non-transitory computer-readable storage medium of claim 13, wherein the executable instructions further cause the computer system to:

provide, for selection by a user, a set of categories; and receive a selection from the user that indicates the category of conduct; and storing the selection in persistent storage.

18. The non-transitory computer-readable storage medium of claim 13, wherein:

the algorithm is a machine learning algorithm trained from a dataset developed at least in part through inter-rater agreements of a plurality of individuals; and the machine learning algorithm receives the standard data structure as input and outputs a value that indicates a statistical certainty that the first set of data and the second set of data are associated with the category of conduct.

19. The non-transitory computer-readable storage medium of claim 13, wherein the executable instructions that cause the computer system to transform the first set of data include executable instructions that cause the computer system to:

obtain, by passing at least a subset of the first set of data as input to a natural language processing algorithm, one or more text labels that describe contents of the at least a subset; and generate the standard data structure at least in part from the one or more text labels.

20. The non-transitory computer-readable storage medium of claim 13, wherein the executable instructions that cause the computer system to output the result to a user interface include executable instructions that cause the computer system to:

generate a report that organizes the first set of data and the second set of data into one or more categories; and in response to receiving a selection of one the one or more categories, display the first set of data and the second set of data in the user interface.

21. The computer-implemented method of claim 1, wherein the first structured dataset further comprises a serializable format, wherein the first structured dataset is selected from the plurality of structured datasets further based on an indication that the structured dataset will be communicated over a network.

22. The computer-implemented method of claim 1, wherein the first structured dataset further comprises a non-serializable format, wherein the first structured dataset is selected from the plurality of structured datasets further based on an indication that the structured dataset will be persisted in database.

* * * * *